United States Patent [19]

Minovitch

[11] Patent Number: 4,730,797
[45] Date of Patent: Mar. 15, 1988

[54] INFLATABLE CORE ORBITAL CONSTRUCTION METHOD AND SPACE STATION

[76] Inventor: Michael A. Minovitch, 2832 St. George St. #6, Los Angeles, Calif. 90027

[21] Appl. No.: 764,713
[22] Filed: Aug. 12, 1985
[51] Int. Cl.[4] .............................................. B64G 1/12
[52] U.S. Cl. ............................... 244/159; 244/158 R; 52/2
[58] Field of Search ............... 244/158 R, 159; 52/2; 156/71, 118, 121, 133; 264/314, 315, 326, 512

[56] References Cited

U.S. PATENT DOCUMENTS

| | | | |
|---|---|---|---|
| 3,144,219 | 8/1964 | Schnitzer | 244/159 |
| 3,300,162 | 1/1967 | Maynard et al. | 244/159 |
| 3,405,886 | 10/1968 | Gosnell et al. | 244/158 R |
| 3,508,270 | 4/1970 | Cook | 244/158 R |
| 3,855,027 | 12/1974 | Erdmann et al. | 264/314 |
| 4,050,972 | 9/1977 | Cardinal, Jr. | 156/71 |

FOREIGN PATENT DOCUMENTS 2334793  7/1977  France ...................................... 52/2

OTHER PUBLICATIONS

"Exploring Papier Mâché", by Victoria Bedford Belts, p. 84.

Primary Examiner—Joseph F. Peters, Jr.
Assistant Examiner—Rodney Corl
Attorney, Agent, or Firm—Christie, Parker & Hale

[57] ABSTRACT

An economical method for constructing large continuous-walled structures in orbit is presented. In this method a lightweight, non-elastic, topologically closed inflatable surface with thin flexible walls is transported to orbit where it is inflated to form a semi-rigid surface. This inflated surface is then used as a guide for constructing the hull of the structure by wrapping the surface with long sheets of high strength material until the desired wall thickness and rigidity is obtained. The wrapping process is accomplished automatically by a wrapping machine. Since the inflatable surface can be packaged into a small volume, and since the sheets of wrapping material can be rolled into spools with very high packing density, it is possible to construct large continuous-walled pressurized structures in orbit using robotics with relatively few Shuttle flights. The method is used to construct a large permanently manned orbiting space station that provides an artificial gravity environment for the living quarters and connecting variable gravity environments for research and materials processing. The basic structural design of the space station consists of a rotating torus with three connecting spoke cylinders and two Earth-fixed column cylinders extending along the rotation axis mounted on each side of the torus' hub.

48 Claims, 30 Drawing Figures

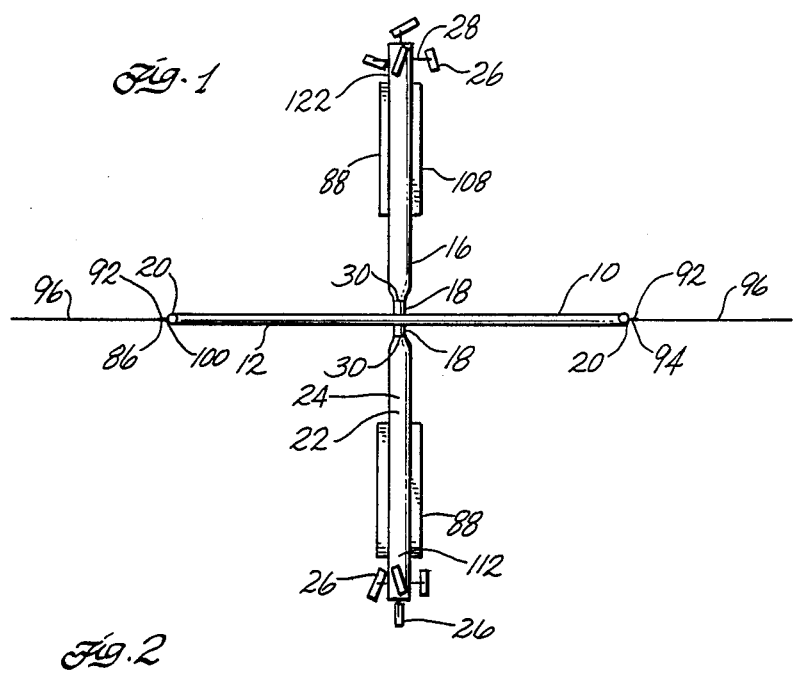
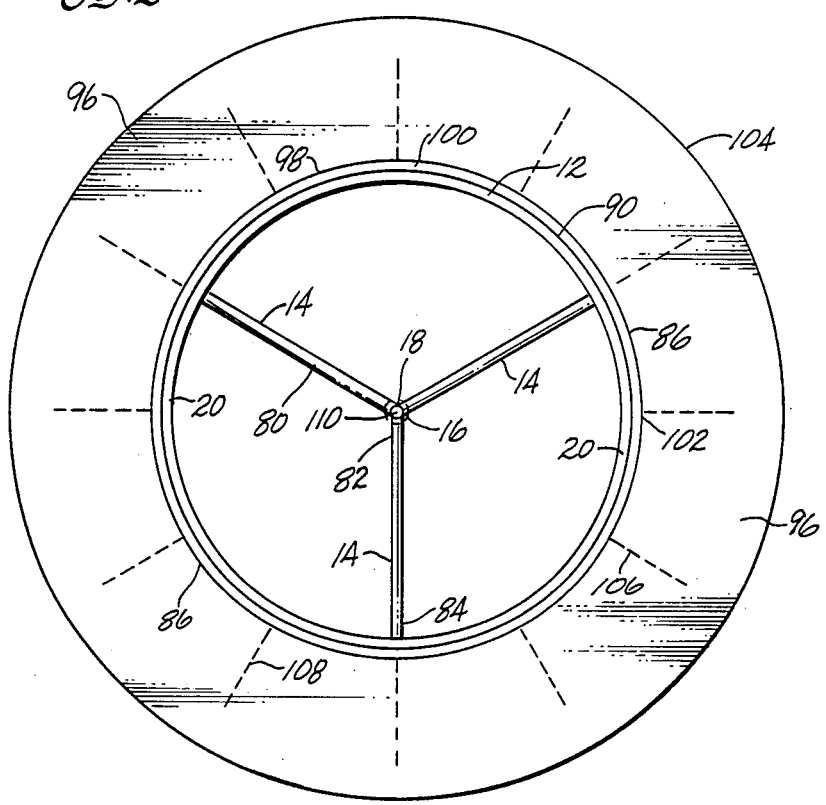

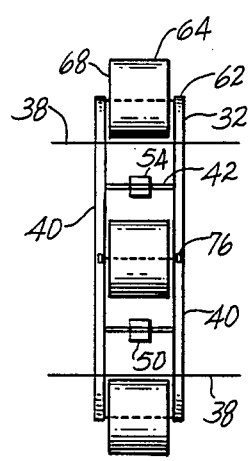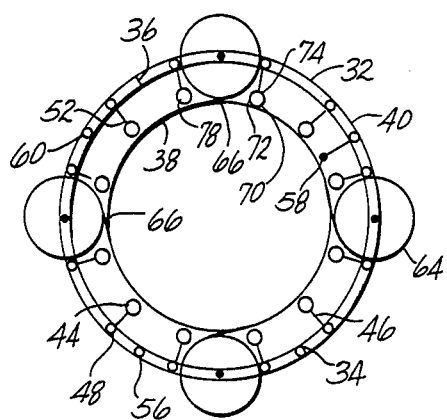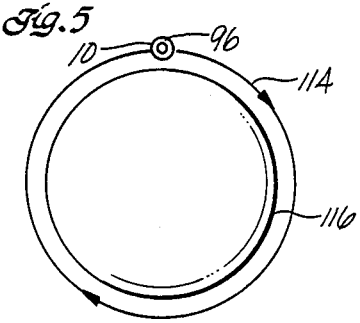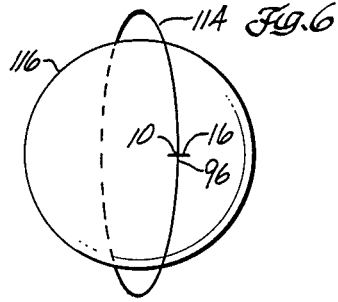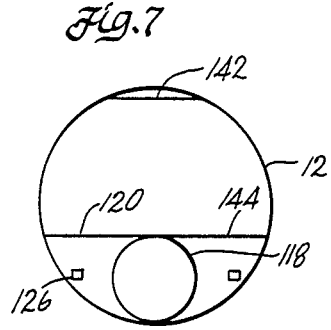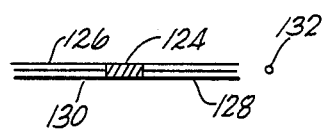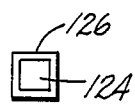

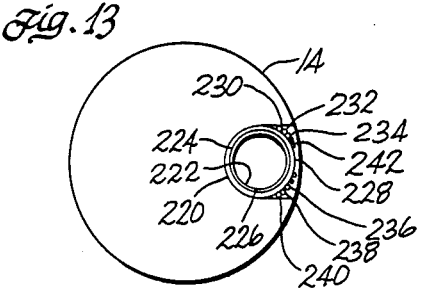
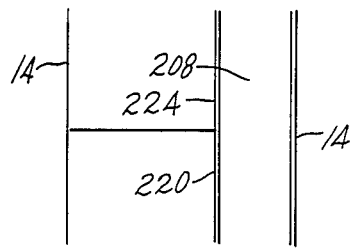
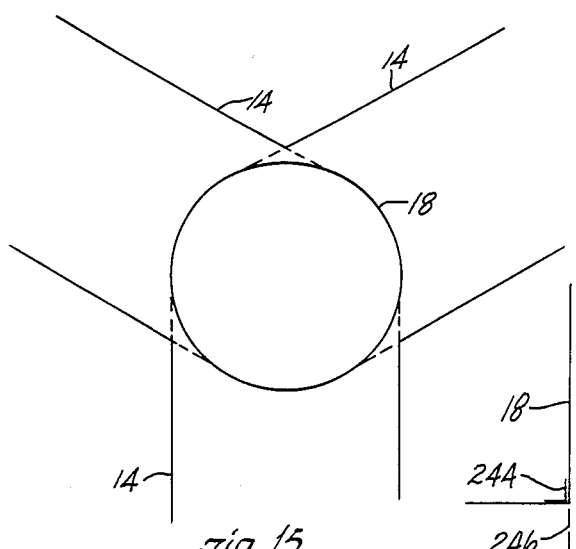
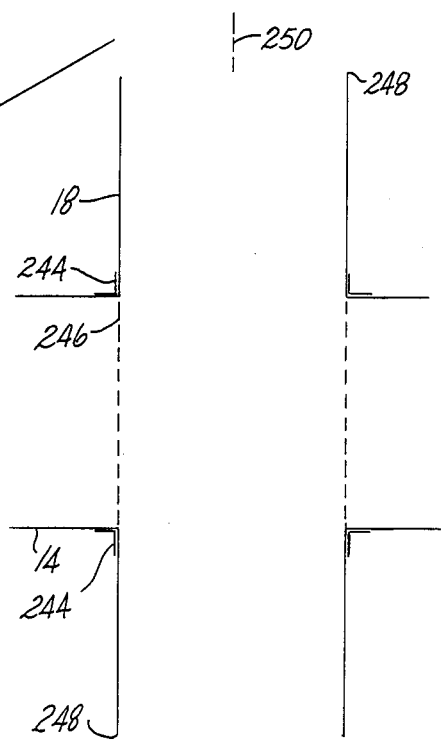

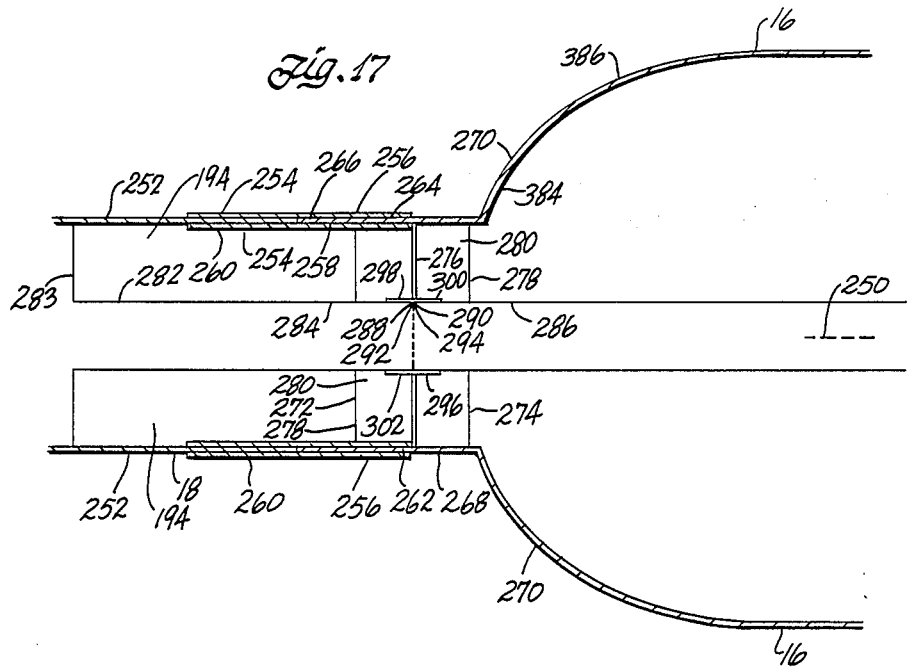
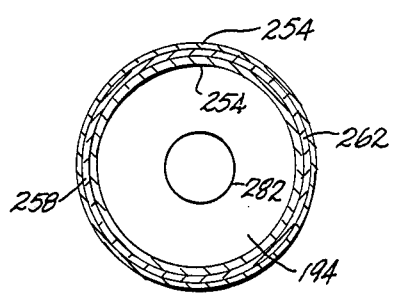
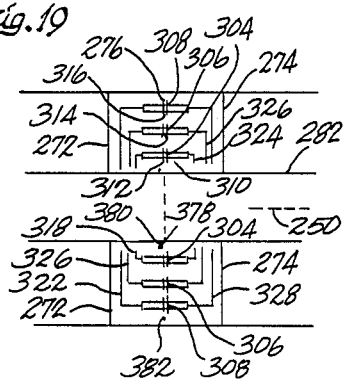
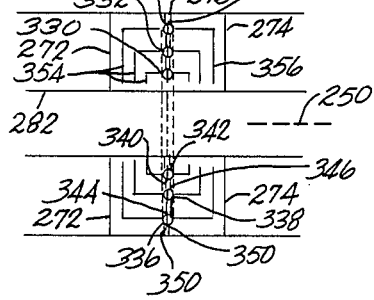

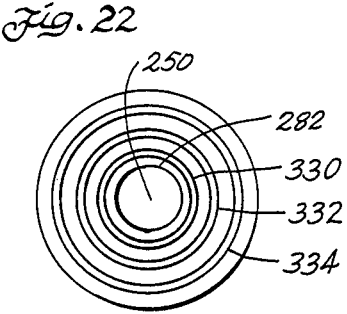
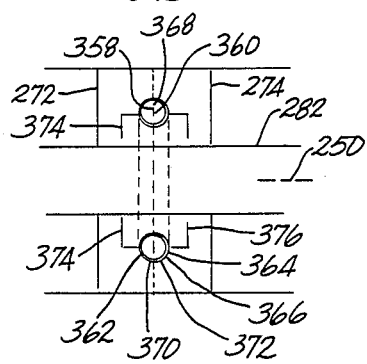
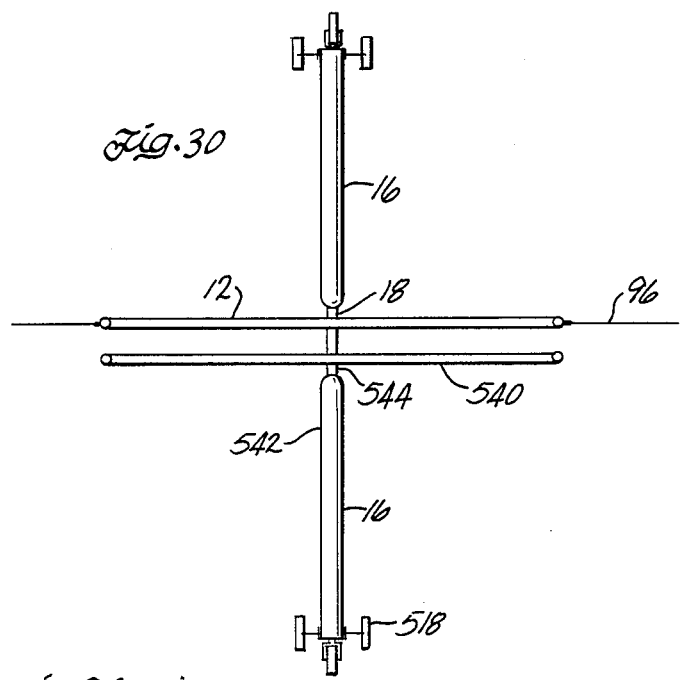
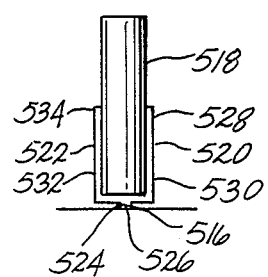
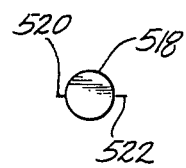

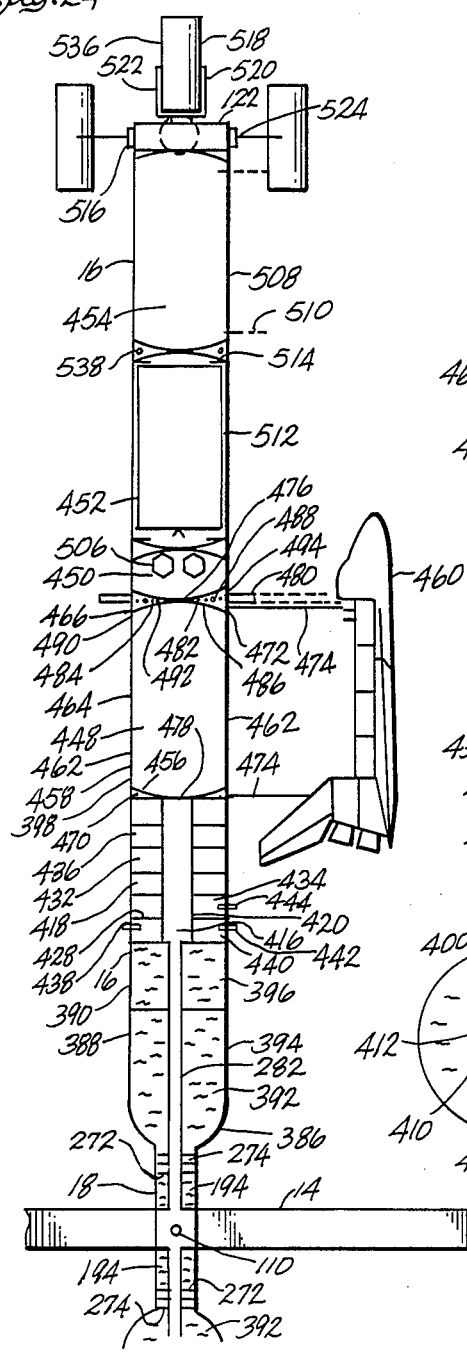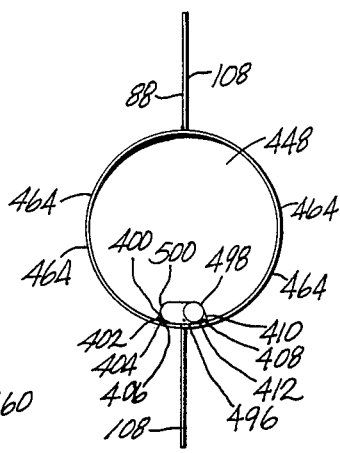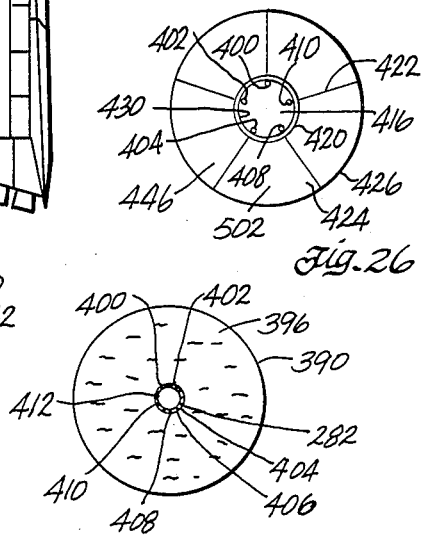

INFLATABLE CORE ORBITAL CONSTRUCTION METHOD AND SPACE STATION

BACKGROUND

The National Aeronautics and Space Administration (NASA) is presently embarked on a project to design, construct and deploy a permanently manned orbiting space station. (See "Space Station: The Next Logical Step," *Aerospace America*, Sept. 1984, pp 47–55 by James M. Beggs.) Such a station is critically important to the advancement of the United States as a world leader because it represents a major step in the commercialization of space and its eventual colonization. Moreover, it will—for the first time in human civilization—provide scientists with a gravity-free environment for conducting fundamental experiments that could eventually lead to revolutionary scientific and technological breakthroughs.

Although it is impossible to list all of the functions that a permanently manned orbiting space station will be engaged in, and the benefits to be derived therefrom, it is important from a design point of view, to understand some of its major functions. One of the most important functions in terms of immediate economic benefits will involve utilizing the station as an "orbiting service station" where previously deployed, but malfunctioning satellites can be repaired, refurbished and redeployed. Another function will involve providing a gravity-free environment for conducting basic scientific experiments in the life and physical sciences. It will also provide a gravity-free environment for manufacturing new materials (such as growing ultra-pure single crystals for computer chips) and developing new drugs for curing various diseases.

The station will also provide a platform for conducting extensive telescopic observations of the Earth's surface by human operators in real-time. Thus, selected areas could be immediately identified for closer inspection using high-power telescopes that will enable photographs to be taken with ultra-high resolution. The instrumentation could include passive infrared sensors for night observations, along with active high-power radar systems. These ground observations would also include extensive meteorological observations resulting in more accurate global weather forecasts.

The space station will also enable trained astronomers to conduct extensive astronomical observations using the most sophisticated equipment. Since the station moves above the atmosphere, the entire electromagnetic spectrum of the universe will be available for detailed investigation. The instrumentation will include powerful optical telescopes, gamma ray and x-ray sensors, infrared telescopes and a whole array of support instrumentation. The least known astronomical objects such as quasars and black holes could be studied that might lead to the discovery of revolutionary theories for generating unlimited amounts of energy.

An advanced manned space station could be equipped with multiple hangars in which completely new satellites could be assembled. A sufficiently large space station could be utilized as a home base for astronaut construction workers assembling huge structures in orbit such as radio antennas or solar power stations. Such stations could also serve as "jumping-off points" for trips to the Moon or to other celestial bodies.

It is difficult to predict or describe all of the immediate economical benefits that a permanently manned orbiting space station will provide. But this much is certain—a permanently manned orbiting space station will give the United States undisputed technological leadership of the world. This, in turn, will make the Earth a safer place to live by significantly reducing the risk of global war.

During the past two years several NASA contractors have been working on, and submitting their design proposals for the first permanently manned orbiting space station. Under the ground rules laid down by NASA, the space station must be compatible with the existing reusable ground-to-orbit Shuttle vehicle. Thus, all of the structural components must be transported to to orbit inside the Shuttle's cargo bay. This cargo bay is approximately cylindrical with a length of 18.29 m (60 ft) and a diameter of 4.57 m (15 ft). The maximum payload mass that the vehicle can deliver to a 28.5° inclination 200 km high circular parking orbit is 30,000 kg (66,140 lbs).

Another important ground rule requires the station to be easily expandable into a larger station by adding more structural components of essentially the same basic design. Thus, the initial space station has to have a basically "modular" design.

In view of the overall budgetary constraints (8 billion dollars) it was immediately assumed that the only practical method for constructing the space station would be to deliver separate prefabricated habitation and support modules to orbit, one-by-one inside the Shuttle cargo bay and assemble them in orbit after all of the modules are delivered. Thus, each module was designed to be cylindrical with an outside diameter not exceeding 4.57 m (15 ft) and an overall length of 13.72 m (45 ft). There would be five pressurized modules altogether comprising two modules for living quarters (i.e. habitation modules), two laboratory modules, and one logistics module. The method selected for generating electric power involved constructing a large array of solar cells. The solar array would be connected to the pressurized modules by complicated open truss-type frames which provide the basic structural support. All of these basic design features were incorporated into each of the various designs. They differed only in their final configurations (i.e., they differed only in the relative positions of the basic components). Since the solar array and parts to the structural frame required two additional Shuttle flights, each design required a total of seven Shuttle flights to assemble.

Of all of the various designs submitted to date, the so-called "Power Tower" design of Rockwell International is the favorite. (See "Power Tower: Living in Orbit," *Science Digest*, June 1985 by Ben Bova.)

In view of the limited size of the habitation cylinders, it is impractical to provide any type of artificial gravity by rotating them. Hence, in the current design, the crew will be forced to live in a weightless state over extended time intervals lasting up to 90 days or more. However, recent medical data accumulated over the past three years with numerous Shuttle flights indicates that about 50% of the astronauts subjected to prolonged weightlessness can be expected to suffer severe "space-sickness". But astronauts are among the most physically fit humans in the general population. If 50% of these people can be expected to suffer space sickness, it is highly likely that the vast majority of the general population will not be able to endure extended periods of weightlessness. Thus, it is highly likely that the most valuable personnel brought up to work in the currently planned space station—such as highly skilled professional astronomers, biologists, chemists, physicists, etc., recruited from leading universities—will be rendered useless by space sickness brought about by prolonged exposure to weightlessness.

This situation poses an ominous threat that could undermine the entire United States effort to build a permanently manned space station because the current plans are based on a design that does not provide any artificial gravity. Moreover, since all of the current NASA plans for constructing much larger space stations in the future are based upon expanding the initial design, they will also be incapable of providing artificial gravity. Thus, there exists the real possibility that after spending many billions of dollars constructing a permanently manned orbiting space station, it may be rendered useless by the simple fact that most of the highly skilled scientists brought up to it become totally incapacitated by space sickness brought about by prolonged exposure to weightlessness.

The most important reason that is used to argue the necessity for constructing a permanently manned orbiting space station is based upon the premise that humans can accomplish tasks in orbit well beyond the capability of automated systems. But it is obvious that if most of the humans living in a space station eventually become incapacitated due to space sickness, this argument is invalid. Is should be pointed out, however, that NASA is attempting to circumvent this critical problem by developing drugs to overcome space sickness. But the weightless state is so new and so vastly different from anything previously experienced by man on Earth, this approach may not be successful.

The root of the problem lies in the assumption that the habitation modules must be constructed on the ground and transported inside the Shuttle cargo bay as complete, prefabricated, living quarters because this requirement forces the modules to be too small for generating any artificial gravity by rotation. But this prefabricated modualr design approach is believed to be an absolute prerequisite for constructing all low cost pressurized space stations because there is currently no known method for constructing rigid, thick-walled, continuous surface, pressurized structures in orbit for manned space stations other than the well known method of transporting completed hull sections and assembling them in orbit one-by-one which will be extremely expensive.

There is another important disadvantage that is inherent in the prefabricated modular design approach. It results in a very poor utilization of the Shuttle's full weight lifting capability. For example, it is estimated that the total mass of the complete Power Tower space station will be 120,000 kg (265,000 lbs). On a strictly weight lifting basis, this mass could be delivered to low Earth orbit (LEO) in only four Shuttle flights instead of the seven that are required. Seven Shuttle flights will be capable of delivering 210,000 kg (463,000 lbs) which is almost twice the mass estimate for the Power Tower.

The present disclosure sets forth an entirely new permanently manned orbiting space station that provides a large artificial gravity environment for the living quarters. It is based upon a fundamentally new low cost method for constructing large, thick-walled, continuous surface pressurized structures in orbit using robotics.

BRIEF SUMMARY OF THE INVENTION

Thus, in the practice of this invention according to a presently preferred embodiment, there is provided an economical method for constructing large continuous-walled pressurized structures in orbit with essentially unlimited dimensions. In this method, a lightweight non-elastic, topologically closed inflatable surface with thin flexible walls is transported to orbit where it it inflated to form a semi-rigid surface. This inflated surface is then used as a guide for constructing the hull of the structure by wrapping the inflated surface with long sheets of high strength material until the desired wall thickness and rigidity is obtained. The wrapping process is accomplished automatically by a wrapping machine. Since the inflatable surface can be packaged into a small volume, and since the sheets of wrapping material can be rolled into spools with very high packing density, it is possible to construct large continuous-walled pressurized structures in orbit using robotics with relatively few Shuttle flights thereby keeping construction costs to a minimum.

This low cost orbital construction method is used to construct a much larger and much more functional permanently manned space station than those disclosed in the prior art. The design of this space station provides a centrifugally produced artificial gravity environment for the living quarters and interconnecting variable gravity environments for conducting experimental research and for materials processing and manufacturing. The basic structural design consists of a rotating torus with three cylindrical spokes converging to a central hub cylinder and two Earth-fixed column cylinders mounted co-axially on each of the hub cylinder and extending in opposite directions along the rotation axis. The rotating hub cylinder of torus is joined to the non-rotating cylinders by air-tight sleeve joints mounted on each end of the hub cylinder. The non-rotating column cylinders provide a zero-gravity environment, while the rotating spoke cylinders provide environments for simulating various gravitational fields with different field strengths—those regions of the spoke cylinders closest to the hub having the weakest gravity, while those regions furthest from the hub having the highest gravity. Thus, the laboratories inside these spoke cylinders are capable of simulating the surface gravitational fields of all those celestial bodies in the solar system, from small moons and astroids up to large planetary sized bodies with masses almost equal to that of the Earth.

The torus, spoke cylinders and central column cylinders are all pressurized and interconnected to provide a normal atmospheric "shirtsleeve" environment. The living quarters are located inside the torus which is rotated at a rate designed to simulate an Earth-like gravitational field.

In the preferred embodiment, electric power is generated by a photovoltaic system represented by a thin, flexible, circular sheet-like array of solar cells attached to the torus' outer rim. The rotation of the torus causes the array to automatically assume a flat rigid disk-like shape without requiring any supporting structure. This allows the array to be self-supporting with extremely low area density.

The rotating torus provides the space station with automatic gyroscopic stability of an extremely high order. This allows the telescopes and other instruments to be pointed with extremely high accuracy. A system of computer controlled moving weights is built into the interior structure of the torus, spoke cylinders and the column cylinders to maintain precise mass distribution, thereby allowing the crew members to freely move around the interior of the station without upsetting its balance.

The spin axis of the rotating torus can be changed to point in any desired direction by a large attitude control moment gyro system mounted in the center of the torus' hub. This system also functions as an inertial energy storage system and is used to spin up or spin down the torus at any time. Additional control moment gyros are mounted along the central axis of the column cylinders and inside the rotating torus.

In the preferred embodiment, the attitude of the space station is maintained such that the spin vector remains perpendicular to the orbital plane. This will result in minimum drag, with essentially zero drag caused by the solar array because it will move edge-wise through the residual atmosphere. Since the array has an extremely low area density and has zero drag, it can be very large for generating several megawatts.

Since atmospheric drag is very low, the station's orbital decay will be very slow. However, some onboard propulsion will be required to periodically restore the station's orbital altitude. This will be provided by a system of high power, high specific impulse, electron cyclotron resonance accelerators mounted on the central column cylinders. The propulsive power of this system is sufficiently high to propel the station onto radically different orbits with relatively little propellant. Due to the unique operating principles of ECR accelerators, the propellant used for operating these engines is human waste products generated by the crew. Thus, no external propellant supply is required to maneuver the space station.

A major feature of the disclosure concerns a novel method for constructing and assembling the superstructure of the space station. The torus has an inflatable inner core composed of high strength, low density, non-elastic Kevlar fabric attached to an internal sealing membrane. The basic hull of the torus is constructed in orbit by first inflating the inner core, and then wrapping it with long sheets of high strength material bonded together to give a thick laminated skin. The skin thickness is designed to make the hull rigid when the internal gas is released and such that it provides a shield against harmful electromagnetic and particle radiation. The skin is also designed to be sufficiently thick so as to prevent penetration by high speed meteoroids.

In the preferred embodiment, the skin has a double wall construction. The inner wall is made up of laminated Kevlar to a thickness of 3.0 mm (0.118 in). This wall is constructed by wrapping the inflated core with long sheets of Kevlar fabric bonded together with a high-strength bonding material to give it a rigid superstrong construction. The outer wall is made up of laminated aluminum alloy sheets to a thickness of 3.0 mm (0.118 in). This wall is constructed by wrapping the inner Kevlar wall with sheets of high-strength aluminum alloy bonded together to give another superstrong, laminated wall. These aluminum alloy sheets are silvered on the outside surfaces so as to reflect essential all optical and near optical radiation. (Although this design feature is not essential, it will render the hull essentially immune from attack with high energy laser beams.). The total skin thickness is 6 mm (0.236 in).

Since the deflated core can be packaged into a relatively small volume with low mass, the full volume and payload mass capacity of the Shuttle's cargo bay can be utilized to transport a very large toroidal core such that, when unfurled and inflated, assumes tremendous dimensions. In the preferred embodiment, the major and minor radii of the torus will be 100 m (328 ft) and 2 m (6.56 ft) respectively. The sheets of Kevlar fabric and aluminum alloy are transported to orbit by two additional Shuttle flights rolled up on spools with high packing density. The transportation to orbit utilizes the full weight lifting capacity of every Shuttle flight.

The wrapping process is completely automated using robotics. A specially designed automatic self-moving, self-guiding "wrapping wheel" is positioned around the inflated inner core of the torus. The inner wall is constructed automatically by loading the wrapping wheel with spools of Kevlar fabric and sending it revolving around the minor axis of the inflated semi-rigid toroidal surface. The spools of Kevlar are mounted in "cartridges" that are loaded into receptacles mounted around the wrapping wheel. Bonding material (such as liquid resin) is also loaded into automatic dispensers positioned around the wrapping wheel. When the sheets are exhausted from each spool, the wrapping wheel is stopped, the empty spool cartridges are removed and replaced with full cartridges, and the wrapping wheel is restarted. The automatic rotating and driving system of the wraping wheel is such that all torques generated by tension in the sheets and small traction driving wheels cancel each other to produce a zero resultant torque. Stability is maintained by several attitude control moment gyros mounted at various positions around the wrapping wheel. The entire wrapping process is computer controlled to give a precise laminated surface. Many complete revolutions around the major axis of the torus may be required to achieve the desired inner wall thickness.

The outer wall of aluminum alloy is constructed in the same method using the same automatic wrapping wheel. The empty cartridges of Kevlar fabric are simply removed and replaced with full cartridges of thin sheets of aluminum alloy. The wheel is started and continued until the outer wall also reaches the desired thickness. The resulting 6 mm (0.236 in) thick, double walled hull is super strong, extremely rigid and has an almost perfect geometrical shape. The surface is extremely smooth without any rivets, bolts or any other fasteners that penetrate through the hull.

The three spoke cylinders are constructed by an identical process. The inside diameters of these cylinders are also 4 m (13.12 ft) so that the same wrapping wheel used to construct the torus can be used to construct the spoke cylinders. In order to simplify their construction, the three spoke cylinders are constructed simultaneously. This is achieved by wrapping a single 300 m long, 4 m diameter inflated core to obtain one complete cylindrical hull, and then cutting it into three equal sections.

This same simplified construction strategy is used to construct the two column cylinders. Each of these column cylinders is 110 m (360.89 ft) long and 10 m (32.81 ft) in diameter. Thus, one 320 m long, 10 m diameter inflated core is wrapped as one complete cylinder and then cut into two equal sections. However, since the diameter is 10 m, a different wrapping machine must be used to construct this hull structure.

The central hub cylinder is 12 m long, 4 m in diameter and is equipped with two, 2 m long rotating sleeve joints mounted on each end. This hull section is constructed on the Earth's surface and is transported to the assembly orbit as a prefabricated unit. This central cylinder also has three, 4 m diameter holes cut around its transverse mid-plane for the spoke cylinders. These holes are surrounded by short cylindrical connecting sections and designed such that the three spoke cylinders can be easily assembled by plugging one end of them into the connecting sections. The other ends of the spoke cylinders are connected to the torus via three holes cut around the inside periphery of the torus.

The task of assembling the relatively few hull sections to form the completed external hull of the space station is designed to be extremely simple and similar to constructing a giant "Tinker Toy". The assembly can be carried out by a few astronaut construction workers using Manned Maneuvering Units (MMU's). By employing these economical construction and assembly techniques, it will be possible to build enormous permanently manned space stations with very low cost.

The proposed space station can be easily expanded by simply bringing up another inflatable core for another torus, and constructing its hull and spoke cylinders (by bringing up more spools of aluminum and Kevlar) and connecting the completed torus to the central hub cylinder. (The automatic wrapping machine used in the original construction could be used to construct the hull of the new torus.) The expansion would be very economical because the additional volume would be substantial but the cost would be relatively low.

The proposed space station disclosed herein could be constructed with a budget slightly more than that currently allocated for the "Power Tower". However, instead of constructing a space station for only 6 to 8 crew members in a nausea inducing zero-gravity environment, the proposed space station will provide living quarters for 150 to 200 crew members in a comfortable Earth-like artificial gravity environment and pressurized laboratory facilities over thirty times greater in volume.

DRAWINGS

These and other advantages and features of the invention will be apparent from the disclosure, which includes the specification with the foregoing and ongoing description, the claims, and the accompanying drawing wherein:

FIG. 1 is a schematic cross-section of the space station taken in the plane of the station's spin axis;

FIG. 2 is a schematic cross-section of the space station taken through the mid-plane of the torus perpendicular to the spin axis;

FIG. 3 is a schematic longitudinal cross-section illustrating the design and construction of an automatic wrapping machine;

FIG. 4 is a schematic transverse cross-section illustrating the design and construction of an automatic wrapping machine;

FIG. 5 is a schematic view showing the space station moving around the Earth taken in the orbital plane illustrating its minimum drag attitude;

FIG. 6 is a schematic view showing the space station moving around the Earth taken perpendicular to the orbital plane illustrating its minimum drag attitude;

FIG. 7 is a schematic transverse cross-section through the toroidal hull of the space station illustrating the superconducting energy storage system;

FIG. 8 is a schematic longitudinal cross-section of a mass balancing channel;

FIG. 9 is a schematic transverse cross-section of a mass balancing channel;

FIG. 13 is an enlarged schematic transverse cross-section through a bulkhead inside one of the spoke cylinders;

FIG. 14 is an enlarged schematic longitudinal cross-section through a portion of one of the spoke cylinders;

FIG. 15 is an enlarged schematic longitudinal cross-section through the central hub cylinder illustrating the rigid connection with the spoke cylinders;

FIG. 16 is an enlarged schematic transverse cross-section through the central hub cylinder illustrating the rigid connection with the spoke cylinders;

FIG. 17 is an enlarged schematic longitudinal cross-section through one end of the central hub cylinder illustrating the construction of the rotating connection to one end of a column cylinder;

FIG. 18 is an enlarged schematic transverse cross-section through one end of the central cylinder illustrating the constuction of the rotating connection to one end of a column cylinder;

FIG. 19 is an enlarged schematic longitudinal cross-section through the adjacent bulkheads on the hub and column cylinders illustrating the design and construction of rotating electrical connections;

FIG. 20 is an enlarged schematic transverse cross-section through the adjacent bulkheads on the hub and column cylinders illustrating the design and construction of rotating electrical connections;

FIG. 21 is an enlarged schematic longitudinal cross-section through the adjacent hub and column cylinder bulkheads illustrating the design and constructioon of rotating gas and liquid connections;

FIG. 22 is an enlarged schematic transverse cross-section through the rotating gas and liquid connections further illustrating their design and construction;

FIG. 23 is an enlarged schematic longitudinal cross-section through a rotating superconducting power cable connection illustrating its design and construction;

FIG. 24 is an enlarged schematic longitudinal cross-section through one of the column cylinders illustrating its internal design and construction;

FIG. 25 is an enlarged transverse cross-section through one of the liquid oxygen cryogenic storage tanks illustrating its design and construction;

FIG. 26 is an enlarged transverse cross-section through a complex of zero-gravity laboratories inside one of the column cylinders;

FIG. 27 is an enlarged transverse cross-section through one of the cargo transfer hangars illustrating its design and construction;

FIG. 28 is a schematic longitudinal cross-section of a prefabricated detachable turret cylinder containing a directed energy weapon system;

FIG. 29 is a schematic transverse cross-section of a prefabricated detachable turret cylinder containing a directed energy weapon system; and FIG. 30 is a schematic cross-section of an expanded space station with two rotating toroidal living quarters, taken in the plane of the station's spin axis.

DESCRIPTION OF THE PREFERRED EMBODIMENT

Figure 10:
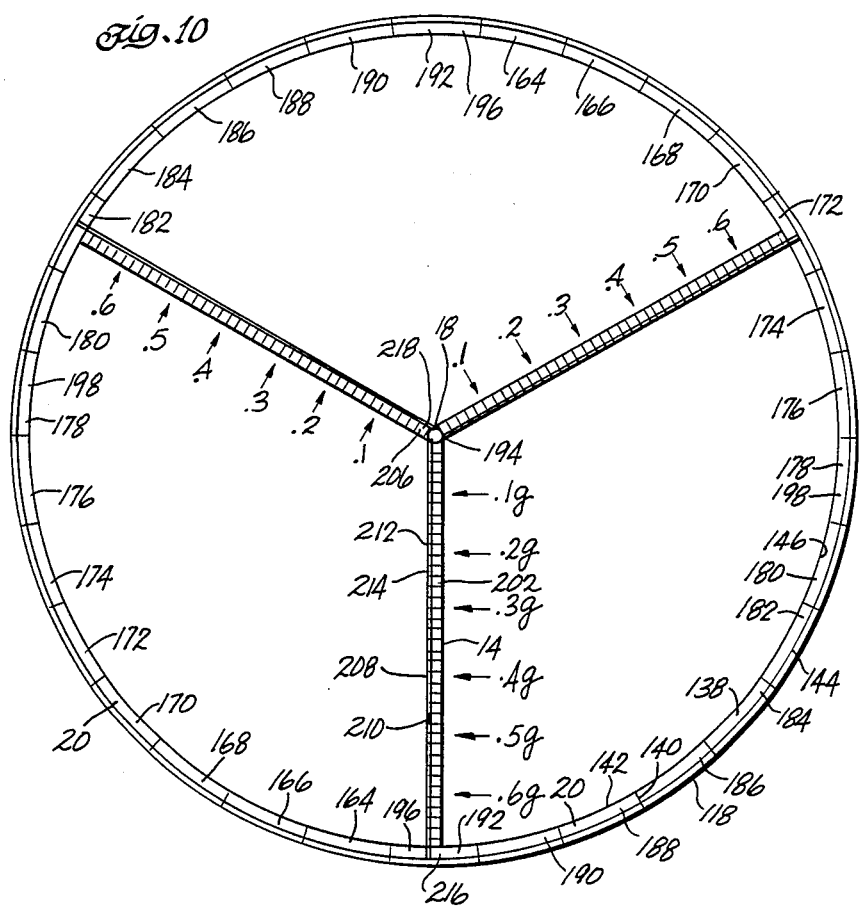
FIG. 10 is an enlarged schematic cross-section through the mid-plane of the torus perpendicular to its spin axis illustrating its internal construction.

The primary purpose of the present disclosure is to introduce a low cost method for constructing large continuous-walled pressurized structures in orbit and to use this method for constructing a permanently manned orbiting space station capable of generating a comfortable artificial, Earth-like, gravity environment for the living quarters, and a zero gravity environment for experimental laboratories. The space station will also provide different artificial gravity environments ranging from 0 g to 0.7 g for simulating the gravitational fields on other celestial bodies. Another important feature is that the space station can be economically expanded indefinitely in an open-ended process to provide Earth-like gravity environments for the living quarters and zero-gravity, and variable gravity environments for experimental laboratories, for an unlimited number of people.

The most important technological breakthrough upon which the proposed space station is based is a new method for constructing extremely large, continuous-walled, pressurized structures in orbit designed for human habitation with very low cost which I call "inflatable core orbital construction". Thus, this method is a central feature of the present invention and has far-reaching implications. For example, this inflatable core construction method cannot only be utilized for constructing enormous orbiting space stations with very low cost, but it can also be utilized for constructing huge space vehicles designed for interplanetary space travel as well. It could make possible the economical construction of large "orbiting hotels" for privately owned commercial enterprises. In fact, it may represent the most economical and efficient method for constructing any large pressurized enclosure in space for human habitation.

Previous to my idea of inflatable core orbital construction, it was believed that the only way large continuous-walled pressurized structures could be constructed in orbit for human habitation was essentially identical to that used for constructing large ocean liners on the Earth's surface. But a large ocean liner is constructed by first collecting the most massive load bearing steel beam sections and assembling them, one-by-one, to obtain the initial load bearing steel frame of the ship's superstructure. The next step involves filling in the open spaces between the beams with continuous-walled steel plate sections, one-by-one. Finally, after several more intermediate steps involving a sequence of adding lighter and lighter materials, the sequence ends with applying the inside wall paper—the least heavy of all construction materials.

The application of this traditional method for constructing a large space station was dramatically illustrated by Aurther C. Clarke in the movie "2001: A Space Odyssey". Unfortunately, this method is extremely costly. In fact, it would probably cost over fifty billion dollars to actually carry out the construction of the orbiting space station described in that movie using the already available Shuttle vehicle. Consequently, since funding on this order of magnitude could not be made available for constructing a permanently manned orbiting space station (having a continuous, clear-volume capacity significantly greater than that of the Shuttle cargo bay) all current permanently manned space station designs are based upon the prefabricated habitation module approach. In this construction method, the hull and interior of each module is constructed entirely on the ground, complete with pressure doors, and then transported to orbit one-by-one as essentially completed integral units where they are mounted on a structural frame and connected together by passageways. Space station designs based on this construction method can be referred to as "assembly from prefabricated modular habitats". It represents design strategy that is several decades old. Unfortunately, when this design strategy is used with the Shuttle vehicle, the maximum possible dimensions for the modules are too small for generating any artificial gravity environment for the crew by rotation—which may render the station useless since a large proportion of the crew may become incapacitated by prolonged exposure to a weightless environment.

According to the prior art, it is believed that since a much larger space station design (of the "2001" variety which does provide an Earth-like artificial gravity environment by rotation) will be too costly, the only solution to this dilemma must come by way of developing a drug to combat space sickness. However, as demonstrated herein, there is a much more practical solution but it involves a fundamentally new and radically different method for constructing large enclosed continuous-walled structures in space for human habitation.

The only reason why large ships on Earth are constructed the way they are is because of gravity. But there is no sensible gravity in a free-fall orbit. Thus, in principle, a ship in space could be constructed by a method that is the complete reverse of how it is constructed on the Earth's surface. It could be constructed by first putting up the least massive material—the wall paper—and constructing the most massive load bearing structure last. This is exactly what is involved in the principle of "inflatable core" orbital construction. The wall paper becomes the inflatable core. By making this "wall paper" semi-rigid, the superstructure can be constructed around it by an automated "wrapping machine" essentially without requiring any astronaut construction workers.

The inflatable core method of space station construction disclosed herein for the first time is made possible largely by the development of a relatively new, high-strength, lightweight material developed by the DuPont corporation called "Kevlar". This material is unique in that the ratio defined by its tensile strength divided by its density is significantly greater than any other known substance. Furthermore, it also has an exceptionally low elongation (i.e., it doesn't stretch). Consequently, by manufacturing this material as a thin flexible fabric (with Kevlar fibers) in the form of a topological "closed surface" and attaching a gas-tight, rubber-like sealing membrane along its inner walls, it is possible to obtain a low mass, high-strength, inflatable surface that can be inflated in space like a balloon but with no stretching (using hydrogen gas) to achieve a semi-rigid ultra lightweight structure with enormous dimensions and with a huge unobstructed interior volume. While in the deflated state, the surface can be packaged into a relatively small volume that can be easily stored inside the Shuttle's cargo bay.

The high tensile strength characteristic of Kevlar is important because when an inflated surface encloses a large volume, the internal pressure will create very high stresses in the surface material. Its low density is important because it enables extremely large inflatable cores to have a relatively low mass thereby allowing them to be transported into space as one complete closed surface. Thus, the combination of these two characteristics, together with the 30,000 kg payload and 300 m³ volume cargo capability of the Shuttle vehicle, enables the inflatable core space construction method disclosed herein to be easily realizable in spectacular proportions.

The actual Kevlar fabric and its internal sealing membrane required for economical inflatable core space station construction will not require any extensive research and development program to manufacture because it already exists. In fact, Kevlar fabric inflatable surfaces have already been manufactured for applications in space. In particular, they are used as the inflatable inner surfaces of aerobreaking systems called "inflatable ballutes". (See the paper, "Experimental Evaluation of an Inflatable Ballute for Application to Aero-Assisted Orbiter Transfer Vehicles," AIAA Paper No. 84-2122, August 1984, by W. C. Woods et al.)

The functional role played by the inflatable surface is crucial to the economical construction method disclosed herein because it provides a high-strength semi-rigid core (i.e., giant three-dimensional "templet") which enables the hull (i.e., external superstructure) of an extremely large clear-volume pressurized habitat to be automatically constructed in orbit by simply wrapping it with thin sheets of suitable material (such as aluminum alloy) in a continuous process using robotics. The discovery of this new construction method represents an important technological breakthrough in the art of constructing large inhabited space stations because it allows an enclosed pressurized continuous-walled superstructure to be constructed by robotics with an unobstructed clear volume capacity many times greater than that of the Shuttle cargo bay at a cost orders of magnitude lower than what would previously be required. Thus, instead of having to construct the superstructure of a large space station with dozens of astronaut construction workers moving around in cumbersome space suits trying to assemble one beam or plate after another with wrenches and other tools, it can be constructed effortlessly by an automatic wrapping machine in a small fraction of the time and with a precision unattainable with human construction workers. Moreover, the completed structure will be significantly stronger and more durable. By using this inflatable core construction method it will be possible to construct an economical, permanently manned space station that is even larger and more elaborate than the science fiction design shown in the movie "2001", yet at a cost only slightly greater than that currently estimated for the proposed "Power Tower" design.

FIGS. 1 and 2 are schematic cross-sections of the proposed permanently manned orbiting space station 10 that is constructed using the inflatable core construction method described above. As is illustrated in these figures, the basic design of the station is represented by a large torus 12 with three radial spoke cylinders 14, and two column cylinders 16 passing through a central hub cylinder 18 perpendicular to the spoke cylinders 14. The living quarters 20 are located inside the torus 12 which is rotated at a rate designed to simulate an Earth-like gravitational field. The central column cylinders 16 are essentially inertially fixed to provide zero-gravity environments but rotated about their longitudinal axis at a very slow rate, equal to 360° per orbit revolution, in order to allow the Earth viewing laboratories 22 to remain permanently facing the Earth, and the sky viewing laboratories 24 to remain facing the sky in the opposite direction. A plurality of instrument cylinders 26 are mounted on movable frames 28 at each end of the column cylinders 16 that can be pointed in any direction. The column cylinders 16 are connected to the hub cylinder 18 by means of rotating air-tight cylindrical sleeve-joints 30.

All of the separate structures comprising the space station represented by the torus 12, the three spoke cylinders 14, the central hub cylinder 18, and the two column cylinders 16, are pressurized with an Earth-like atmosphere and interconnected to allow the crew members to move freely from one section to another section in a continuous Earth-like atmospheric environment without having to wear any space suits or without having to pass through any air-locks. The unique ability of the space station 10 to simultaneously provide a rotating centrifugally produced artificial gravity environment for the living quarters 20, together with large zero-gravity environments for experimental laboratories, while allowing crew members to move freely and unhindered from a gravity environment to a non-gravity environment in an Earth-like pressurized atmosphere without requiring any space suits or air-locks, is an important design feature of the proposed space station.

Since the proposed space station is to be constructed by my inflatable core construction method, its dimensions can be very large without any significant increase in construction cost. Of course, filling all of the available volume of the space station with sophisticated equipment and instrumentation will be expensive but my primary concern is in the cost involved in constructing the superstructure and equipping it with its basic operating systems.

In order to estimate the basic construction cost it is necessary to set some design dimensions. Thus, in the preferred embodiment, the transverse cross-sections of the torus 12 and spoke cylinders 14, are circular with an inside diameter of 4 m (13.12 ft). The radius of the torus' semi-major axis is 100 m (328.08 ft). The transverse cross-sections of the two column cylinders 16 are also circular but have diameters of 10 m (32.81 ft) and lengths of 110 m (360.89 ft). Although the enormous size of the proposed space station renders it essentially unrealizable using prior art construction methods (the overall length of the station is over 800 ft) it will be demonstrated herein that it can be easily constructed using my inflatable core construction method with remarkably low cost.

The torus 12 will be the first section of the space station that is constructed. Since the surface area A of a torus is given by the formula $$A = 4\pi^2 Rr \qquad (1)$$

where R and r denote the major and minor radii respectively, the torus proposed for the space station will have an internal surface area of 7,895.68 m² (84,988.43 ft²). Consequently, since the Kevlar fabric inflatable core (including the sealing membrane) has an area density of about 1.00 kg/m² (assuming an inflation pressure of 1

N/cm²) the total mass of the deflated toroidal core will be 7895.68 kg. It will be packaged into a relatively small volume and stored inside the cargo bay of a Shuttle vehicle for transportation to orbit.

The formula for the volume V of a torus is given by $$V = 2\pi^2 R r^2 \qquad (2)$$

Hence, the proposed torus will have an internal volume of 7895.68 m³. The amount of hydrogen gas required to inflate the core to a pressure of 1.0 N/cm² (1.45 lb/in²) assuming an average gas temperature of 20° C., is 70 kg. Consequently, the deflated core (in its rolled up, packaged configuration), the hydrogen, the hydrogen storage vessel, the inflation system and all other related systems will have a total mass of about 8,500 kg.

FIGS. 3 and 4 are schematic longitudinal and transverse cross-sections illustrating the design and construction of an automatic wrapping machine 32. The machine 32 is equipped with hinges 34 and locking latches 36 for opening the machine 32, mounting it around the inflated core 38 of the torus, and locking it into position. The basic structural frame of the wrapping machine 32 consists of two spaced-apart, equidistant transverse rings 40. A plurality of relatively small longitudinal support beams 42 connect the rings 40 together and maintain them in a spaced-apart configuration.

The wrapping machine 32 rotates around the transverse circumferential periphery (i.e., the minor axis) of the inflated toroidal core 38 by a plurality of relatively small traction wheels 44. These wheels 44 are connected to the supporting ring frame 40 via stand-off beams 46 which together with the wheels 44, comprise a suspension system. The wheels 44 are mounted equidistant from each other and extend 360° completely around the circumferential periphery of the ring frame 40. Hence, as the machine 32 rotates around the inflated core 38, the separation distance between the ring frame 40 and the surface of the inflated core 38 remains constant. The traction wheels 44 have a wide track and a relatively large contact surface area such that there is very little depression into the surface of the inflated core when the wheels 44 move over it. The surface of the wheels 44 are also designed to give a high coefficient of friction with the core surface to prevent slipping and increase traction.

The wheels 44 are driven by small electric motors 48 that receive electric power from a bank of batteries 50 mounted on the main supporting frame 40. The wheels 44 are also steerable via servomotors 52 such that when the wrapping machine 32 makes one complete revolution around the minor axis of the inflated toroidal core 38, it advances about 0.90 m (2.95 ft) around the major axis. Thus, the machine 32 is guided around the inflated core with a certain pre-set pitch angle. Steering commands are received from a central control computer 54 which also controls the amount of driving torque generated by each wheel motor 48. The central control computer 54 generates its guidance and control commands based on navigational information received from a plurality of inertial guidance sensors 56 and optical surface tracking sensors 58 that monitors the relative motion between the wrapping machine and the toroidal surface. The attitude of the automatic wrapping machine 32 is controlled by a plurality of spinning attitude control moment gyros 60.

The wrapping machine 32 is equipped with four receptacles 62 mounted around the circumferential periphery of the machine at 90° intervals between the two supporting rings 40. A spool 64 of 1 m (3.28 ft) wide continuous fabric 66, manufactured with super high strength Kevlar fibers and mounted inside a cartridge frame 68, is loaded into each receptacle 62. Four other replaceable cartridges 70, containing a high-strength bonding material 72 (such as liquid resin) are loaded into four automatic bonding dispensing systems 74, located adjacent each spool cartridge 68. As the wrapping machine 32 rotates around the inflated core 38, continuous sheets of super high strength Kevlar fabric 66 is automatically wrapped around, and bonded to the inflated core 38 and to each other. The tension in each sheet is adjusted by automatic computer controlled tension adjusting systems 76 that balance the driving torque generated by the traction wheels 44 such that the net torque exerted on the inflated core 38 is zero. Consequently, as the machine 32 moves around the core 38, a super strong laminated wall is gradually built up to essentially any desired thickness. As soon as the spools 64 of Kevlar fabric are exhausted, the corresponding cartridges 68 are removed and replaced by full ones brought up in other Shuttle flights.

In the preferred embodiment the laminated Kevlar wall is designed to be 3 mm (0.118 in) thick. When this wall thickness is reached, the Kevlar cartridges are replaced by cartridges filled with spools of 1 m wide sheets of high-strength aluminum alloy. The wrapping machine 32 is restarted which automatically constructs an outer wall of aluminum on top of the inner wall of Kevlar. The aluminum alloy sheets are relatively thin such that many layers are required to reach the desired wall thickness which is also 3 mm (0.118 in). These sheets are also bonded together to give a strong laminated wall. The aluminum sheets are also silvered on the outer surface to reflect essentially all optical or near optical radiation. This design feature will make the outer wall essentially immune from attack by hostile laser beams. If a laser beam is able to penetrate the first layer of a reflecting aluminum sheet, it would have to penetrate through all of the remaining reflecting sheets in order to reach the inner Kevlar wall. This would be virtually impossible. The Kevlar inner wall will provide a shield against particle beams and kinetic energy weapon systems. It will also provide an excellent shield for high speed meteoroids. (Kevlar fabric is the basic material used in the manufacture of bullet proof vests.) Consequently, this super high-strength double wall construction will provide a high degree of protection from natural or man-made bombardment.

The entire process of constructing the external hull of the torus 12 in orbit is extremely simple. It begins by withdrawing the inflatable core of the torus from the Shuttle cargo bay and inflating it (by an automatic inflation process). The next step involves withdrawing the automatic wrapping machine. (The total unloaded mass of this machine will be about 1,000 kg.) The machine is maneuvered to the inflated core and locked into position around the core's minor axis. The cartridges of Kevlar spools are then loaded into the receptacles. The cartridges of bonding material are also loaded. All of these procedures can be easily accomplished by three or four astronauts equipped with manned maneuvering units (MMU's). Loading the various cartridges is easy because they are designed to slip into the corresponding receptacles without requiring any careful pre-alignment or other tedious procedures. After all of these tasks are completed, the wrapping machine 32 is started by remote control from inside the Shuttle vehicle.

The automatic wrapping process begins when the driving motors 48 are energized with electric current drawn from the storage batteries 50. After the wrapping machine 32 begins moving around the inflated core 38, the steering mechanism 52 is carefully adjusted, by the central control computer 54, such that the machine 32 rotates around the inflated core 38 with a certain preselected pitch angle.

After the wrapping machine 32 completes a few revolutions around the inflated core 38 in order to accurately establish a pre-selected surface track, the four bonding dispensing systems 74 begin to automatically dispense (via a spraying or brushing mechanism) a continuous 1 m (3.28 ft) wide film of bonding material to the moving surface directly ahead of the spools of Kevlar fabric. After a short distance, these spools begin rotating and sheets of Kevlar fabric begin to emerge out of the four cartridges. The fabric makes contact with the bonding material and are pressed lightly against it by a plurality of soft-surfaced, 1 m wide rollers 78. The tension in the sheets are automatically adjusted by the tension adjusting systems 76 receiving commands from the central control computer 54 such that the net torque exerted on the core is zero. The machine continues to move around the inflated core 38 while automatically wrapping four sheets of Kevlar fabric that are automatically bonded to each other and to the surface of the inflated core to produce a laminated wall.

This automatic wrapping process continues until the spools of Kevlar sheets are exhausted. When this happens, the machine is stopped, the empty spool cartridges are removed and replaced with full cartridges, and the machine is restarted. The process is continued until the desired wall thickness is obtained. When this happens, the empty cartridges of Kevlar fabric are replaced with full cartridges of aluminum alloy sheets and the wrapping process is continued until the outer aluminum wall is completed. The finished structure is a smooth continuous, super-strong laminated, double walled hull, without any punctures for bolts or rivets. Except for the times when the cartridges need to be replaced, the entire process is completely automatic.

The total number of Shuttle flights required to deliver all of the cartridges of Kevlar and aluminum depends upon the desired final wall thickness of the torus 12. In the preferred embodiment the total wall thickness will be 6 mm (0.236 in) made up of 3 mm of aluminum sheet metal and 3 mm of Kevlar fabric. The density of the high strength aluminum alloy is 2,699 kg/m$^3$. The density of the Kevlar fabric is 688 kg/m$^3$. Since the fabric is composed of Kevlar fibers and is not solid Kevlar, this density is less than that of solid Kevlar, which is 1,440 kg/m$^3$. Consequently, after the bonding material is added to the fabric, its density will be increased to about 1,200 kg/m$^3$ which is assumed to be solid. Since the total surface area of the torus is 7,895.68 m$^2$, a wall thickness of 6 mm will correspond to a total wall volume of 47.37 m$^3$. Thus, the volume of the inner wall will be 23.69 m$^3$ and will have a mass of 28,424 kg and the volume of the outer wall will also be 23.69 m$^3$ but will have a mass of 63,931 kg. Hence the total mass of the double walled toroidal structure will be 92,355 kg.

The first Shuttle flight will carry the inflatable core system (8,500 kg), the wrapping machine (1,000 kg) and 20,500 kg of Kevlar cartridges. The second flight will be loaded with 7,924 kg of Kevlar cartridges and 22,076 kg of aluminum cartridges. The third flight will be loaded with 30,000 kg of aluminum cartridges. The fourth flight will be loaded with 11,855 kg of aluminum cartridges that will complete the torus and 18,145 kg of payload that can be used to begin constructing the three spoke cylinders. Thus, it will required about 3½ Shuttle flights to construct the hull of the torus. The entire superstructure of the huge 204 m (670 ft) diameter torus would be automatically constructed by the wrapping machine.

Since a wall thickness of 6 mm (¼ inch) is much thicker than prior art space station designs, it will be capable of offering better protection from harmful high energy, particle and electromagnetic radiation (such are high energy proton emmission and ultra violet light radiation from the Sun). Moreover, as pointed out above, since high strength Kevlar is the same material used in the construction of bullet proof vests, it will also provide an almost impenetrable shield against meteoroids.

Since the diameters of the three 100 m long spoke cylinders 14 are all equal, they can be simultaneously constructed by constructing one, 300 m long cylinder, and cutting it into three identical sections. The same automatic wrapping machine used to construct the torus can be used to construct the spoke cylinders because the transverse diameters of the spoke cylinders are equal to the transverse diameter of the torus. Thus, the construction of the three spoke cylinder sections begins by transporting a deflated 300 m (984.25 ft) long, 4 m (13.12 ft) diameter cylindrical core (with hemispherical end caps to make it a closed surface) to the assembly orbit inside the Shuttle vehicle and inflating it with hydrogen gas. The procedure is identical to that described above for the construction of the torus. The total surface area of this inflatable core is 3,820.18 m$^2$. Hence, its mass will be 3,820 kg. The total inflated volume will be 3,803.42 m$^3$. Hence, the amount of hydrogen gas required to inflate the core to a pressure of 1.0 N/cm$^2$ (1.45 lb/in$^2$) with an average gas temperature of 20° C., will only be 34 kg. Thus, the deflated core (in its rolled up packaged configuration) the hydrogen, the hydrogen storage vessel, the inflation system and all other related systems will have a total mass of about 3,900 kg.

After the cylindrical core is inflated, the automatic wrapping machine is positioned around one end and loaded with cartridges of Kevlar fabric. The machine is then turned on and it begins to automatically wrap the sheets of Kevlar fabric around the inflated core in a continuous and extremely precise path. When the Kevlar spools are exhausted from the initial cartridges, they are replaced with new ones. The automatic wrapping process is identical to that described for the construction of the torus except that when the machine reaches the end of the 300 m long cylinder, it is stopped and the sheets of Kevlar fabric are cut. The wheels 44 are then turned slightly to the other side of the center line, so that the wrapping machine 32 will sweep back towards the other end as it rotates around the cylinder's longitudinal axis. After the wheels 44 are changed to the new direction, the wrapping process is restarted, and the machine begins to move toward the other end of the cylinder as it rotates around the axis. This process of stopping, changing direction, and restarting when the machine reaches each end of the cylinder is also completely automatic. Thus, as the machine rotates around the axis of the cylinder, it sweeps back and forth building up the thickness of the laminated wall with four new sheets of bonded Kevlar fabric on each pass. After the desired inner wall thickness of 3 mm is reached, the empty cartridges of Kevlar fabric are replaced with full cartridges of aluminum alloy sheets and the wrapping process is resumed. The wrapping process is continued as before until the desired 3 mm outer aluminum wall thickness is reached.

Since the total surface area to be covered is 3,769.91 $m^2$, it will require 11.31 $m^3$ of aluminum with a total mass of 30,525 kg and 11.31 $m^3$ of Kevlar with a total mass of 13,572 kg to complete the wrapping process. Of the 18,145 kg payload mass allocated to start construction of the spoke cylinders on the fourth Shuttle flight, 3,900 kg is used for bringing up the 300 m long inflatable core system, 13,572 kg for the complete Kevlar inner wall and 673 kg of bonding material. The fifth Shuttle flight is used for bringing up all of the aluminum cartridges required for completing the outer wall.

After the 300 m long cylinder is constructed, it is cut into three, 100 m long identical sections that become the three spoke cylinders. The cutting machine could be a portable high speed electric circular saw with hardened teeth that is operated by one or two astronauts. The saw could be guided extremely accurately by a large templet that is mounted and pre-positioned around the circumferential periphery of the cylinder. The templet could be designed with a narrow slot just wide enough for the circular blade to enter such that the cutting process would be relatively easy but very accurate.

The construction of the two, 110 m long, 10 m diameter column cylinders proceeds by constructing one, 220 m (722 ft) long cylinder and cutting it into two equal sections. The inflatable core of this cylinder will have a surface area of 7,225.66 $m^2$. Consequently, its mass will be 7,226 kg. Thus, the total system mass required for this inflatable core and its inflation system will be about 7,500 kg. The surface area to be wrapped is 6,911.50 $m^2$. Hence this wrapping job will required 20.73 $m^3$ of Kevlar fabric with a mass of 24,881 kg and 20.73 $m^3$ of aluminum alloy sheet metal with a mass of 55,962 kg. However, this wrapping job will require a different wrapping machine since the diameter of the cylinder is larger.

Suppose that the unloaded mass of the new wrapping machine is 1,500 kg. Then, since the mass of the inflatable core system of this 10 m diameter cylinder will be about 7,500 kg, a total of 21,000 kg of Kevlar cartridges could be transported up with this core on the sixth Shuttle flight. The seventh Shuttle flight will contain the 3,881 kg of additional Kevlar fabric required to complete the inner wall and 26,119 kg of aluminum alloy to begin constructing the outer wall. The eighth Shuttle flight will contain the remaining aluminum alloy required to complete the outer wall.

In order to simplify the job of assemblying the space station, the central hub section 18, complete with rotating air-tight sleeve joints 30 mounted on each end, is prefabricated on the ground and transported up to the assembly orbit in the ninth Shuttle flight as one complete unit. It has an inside diameter of 4 m (13.12 ft) and an overall length of 12 m (39.37 ft). Three holes are pre-cut for the spoke cylinders 14 and equipped with small cylindrical, attaching flanges for easy assembly. All of the internal leak-proof annular swivel joints for the various conduits are pre-assembled. Likewise, all of the rotating electrical connections are pre-assembled for easy hook-up. The interior is completely equipped with all of the systems, conduits and electrical wiring preinstalled. However, for reasons that will be explained later, the central attitude control moment gyro is not preinstalled. It will be transported to orbit later and mounted at the center of the hub cylinder after the basic superstructure of the space station is assembled. The total mass of this pre-fabricated central hub cylinder 18 is estimated to be about 15,000 kg. The remaining 15,000 kg payload of the ninth Shuttle flight will consist of 30 transverse pressure bulkheads for the interior of the torus. Thus, it will require a total of nine Shuttle flights to construct the basic external superstructure of the proposed space station.

The tenth Shuttle flight will be used for bringing up additional transverse pressure bulkheads for the spoke cylinders. Since the diameters of all of these transverse bulkheads will be 4 m (13.12 ft) they are all prefabricated on the ground and transported up to the assembly orbit as complete sections ready to be installed inside the torus and spoke cylinders.

Before the spoke cylinders 14 can be connected to the torus, three holes will have to be cut around the inside periphery of the torus. This is accomplished by the same method used to cut the spoke cylinders and column cylinders. A specially designed cutting guide templet is mounted around the minor axis of one portion of the torus and pre-positioned with high accuracy. With the aid of this guide templet, one or two astronauts use the portable cylinder saw to cut the first hole with very high accuracy. This hole is then used as the reference hole for pre-positioning the guide templet to two other locations around the torus for cutting out the two remaining holes with very high accuracy. Before the spoke cylinders are connected to the torus, all of the torus' transverse bulkheads and other large internal structure are deposited inside for easy assembly later on.

After the prefabricated central hub section is transported to orbit, the superstructure of the space station is assembled like a giant "Tinker Toy" with a few astronauts using manned maneuvering units (MMU's). Since there are so few sections, the task of assembling them is relatively easy. The three spoke cylinders 14 are assembled by inserting each end into corresponding holes in the torus 12 and hub cylinder 18. The two column cylinders 16 are assembled by attaching them to the prefabricated sleeve joints 30. All of the connections are secured and made air-tight by prefabricated flanges that are designed for easy mounting.

Except for the final assembly (which will be relatively easy) and a few minor tasks, the entire outside superstructure of the proposed space station is constructed in orbit by robotics represented by the automatic wrapping machine. Since these machines can be easily constructed with today's technology using essentially "off-the-shelf" components, and transported to orbit inside the Shuttle cargo bay, this essentially automatic orbital construction method is well within the current state of the art.

The most important conclusion that is demonstrated by all of this construction analysis is the fact that by using the inflatable core construction method, it is possible to construct the entire superstructure of the proposed space station illustrated in FIGS. 1 and 2 (with a diameter of 670 ft and a length of 803 ft) automatically using robotics with only 10 Shuttle flights. Yet, this space station design—which offers a comfortable Earth-like artificial gravity environment for the living quarters—has more than 30 times the pressurized habitation volume of the Power Tower design, which requires 7 Shuttle flights to deliver, and which provides no artificial gravity. Since the total Earth-to-orbit transportation cost of each Shuttle flight is expected to be $71.4 million after October 1988, these ten flights would only cost a total of $714 million. (See "Shuttle Price," *Aviation Week & Space Technology*, May 27, 1985, p. 15.)

The proposed space station can also be easily expanded in an open-ended process in truly giant steps. For example, a second rotating torus could be constructed in orbit and attached to one of the column cylinders. Using the inflatable core construction method, it would only require four Shuttle flights. This would double the capacity of the living quarters from 150 persons to 300 persons.

Although the Power Tower space station design probably represents the most economical design possible based on prior-art prefabricated modular construction methods, the introduction of the economical inflatable core method of orbital construction enables the space station designer to leap-frog several decades into the future to construct space stations with today's technology that provide vastly improved personal comfort and laboratory facilities capable of offering fundamentally new environments for conducting scientific research. The remainder of this disclosure will be directed at pointing out the benefits and the enormous economical advantages of the proposed permanently manned orbiting space station that is made possible by the inflatable core method of orbital construction.

Besides economy of construction, one of the most important immediate benefits offered by the proposed space station is its capability for providing an Earth-like artificial gravity environment for the living quarters. The magnitude of the artificial gravity G (expressed in terms of Earth "g" units) that is created inside the toroidal living quarters by centrifugal force via rotation, is given by the formula $$G = \omega^2 R / g \quad (3)$$

where R denotes the radius of the major axis of the torus, $\omega$ denotes its angular velocity (rad/sec) and where $g = 9.80$ m/sec$^2$. In the preferred embodiment, the torus is rotated at a rate designed to produce an artificial gravity environment of 0.7g. Therefore, since $R = 100$ m, the torus will have an angular velocity of 0.262 rad/sec. This corresponds to a rotation rate of one complete revolution every 23.989 sec (or 2.501 revolutions per minute).

The fact that the radius of rotation R is large means that the angular velocity $\omega$ required to create a reasonably high artificial gravity environment inside the torus will be relatively low. This, in turn, means that the disorienting effects of Coriolis accelerations experienced by a person moving inside the torus with velocity $\vec{v}$ (equal to $2/g$) $\vec{\omega} \times \vec{v}$ in "g" units) will be relatively small and, for all practical purposes, negligible. However, if R were small (e.g., less than 20 m) the required $\omega$ needed to simulate a reasonably high gravitational field will be high. But this would result in high Coriolis accelerations that could, in itself, produce much more severe nausea than is induced by weightlessness. Consequently, unless R is reasonably large, it would probably be better not to rotate and suffer nausea from the effects of weightlessness, rather than to rotate and suffer nausea from the effects of Coriolis accelerations. The important point to be made here is that the inflatable core construction method enables the rotation radius R to be sufficiently large to create an artificial gravitational field that will truly be Earth-like with negligible Coriolis accelerations. It would be extremely costly (and therefore impractical) to construct all of the structural supporting frames required to rotate the small prefabricated habitation modules of the Power Tower around a sufficiently long rotation arm. Moreover, even if this construction were carried out, the resulting structure would probably be incapable of fulfilling the basic functional requirements of a space station.

Not only will the proposed space station be capable of generating an artificial Earth-like gravitational field for the living quarters inside the torus, but it will also be capable of generating an infinite number of different artificial gravitational fields inside the spoke cylinders. Thus, numerous experimental laboratories 80 are constructed inside each spoke cylinder 14 at various distances from the central hub 18 to simulate gravitational fields ranging from 0.05g to 0.70g. Those laboratories 82 (FIG. 2) located closest to the central hub 18 have the lowest gravity, while those laboratories 84 located furthest from the hub 18 have the highest gravity. The magnitudes of the artificial gravities created in these laboratories can be computed from equation (3) where in this case, R denotes the distance to the center of the hub. Notice that even though R will be very small for laboratories closest to the hub, the Coriolis acceleration will always be negligible. This is because the angular velocity $\omega$ is a constant and always remains low (with a value of 0.262 rad/sec). The resulting centrifugally produced artificial gravitational fields will therefore resemble those generated by the mass of actual celestial bodies. Consequently, the laboratories located inside these spoke cylinders 14 are capable of accurately simulating the surface gravitational fields of all those celestial bodies in the solar system ranging from small moons and astroids to large planetary sized bodies with masses almost equal to that of the Earth. These laboratories will be extremely useful for testing machines and equipment for use in future manned interplanetary landing missions to other celestial bodies. Thus, this capability of the space station to simulate gravitational fields with different field strengths is another important and unique design feature of the proposed space station.

Two large single-sided space radiator systems 86,88 (FIGS. 1,2) are provided for expelling excess heat generated by all of the equipment and operating systems and for maintaining a comfortable temperature inside the space station for the crew. (Since the station is designed for a crew of about 150 persons, the complete environmental control system will include extensive air conditioning and circulating systems which will generate a considerable amount of excess heat.) The first radiator panel 86 is circular and is mounted around the outside rim 90 of the torus 12 and has the form of a thin annular disk. The width is 4 m (13.12 ft). Hence, the radii of the inside and outside edges are 102 m (334.56 ft) and 106 m (347.77 ft) respectively. The total effective area of this radiator is 2,613.81 m$^2$ (28,134.76 ft$^2$). The second radiator system consists of four long rectangular arrays 88 mounted in pairs on diametrically opposite sides of the two column cylinders 16. Each array is 6 m (19.69 ft) wide and 60 m (196.85 ft) long. The total area of these radiator panels is 1,440 m$^2$ (15,500.03 ft$^2$).

The other sides 92 of the radiator panels 86,88 are illuminated with sunlight. Hence, they serve as heating surfaces for circulating fluids and for providing hot water etc., inside the space station. A layer of thermal insulation 94 is inserted between the surface to thermally isolate one side from the other.

In the preferred embodiment, the primary electric generating system is photovoltaic as shown in FIGS. 1 and 2, and comprises a thin, circular, flexible sheet-like array of solar cells 96 attached to the outer rim 98 of the annular radiator/heating panel 100 mounted on the torus 12. The rotation of the torus 12 causes the array 96 to automatically assume a flat annular disk-like shape without requiring any supporting structure. The array 96 is automatically kept riding by virtue of its own rotation. The significance of this design feature is extremely important because it allows the array 96 to be completely self-supporting with an extremely low area density. For example, by constructing the array with high efficiency, thin film gallium arsenide (GaAs) cells, it is possible to achieve an area density of about 0.5 kg/m$^2$—and this low area density includes all of the electrical connections and related wiring. Moreover, the efficiency of these solar cells will be about 18%. (See the article "Solar Cells For Tommorrow's Spacecraft," *Aerospace America, February* 1985, by Peter A. Illes and Ku Sun Ling.)

The design strategy of the space station will involve utilizing one Shuttle flight to deliver a single annular disk-shaped thin flexible sheet of GaAs solar cells (folded up in a relatively small volume) with a total mass equal to the maximum ground to orbit Shuttle payload capability—30,000 kg. Thus, the area of the sheet will be 60,000 m$^2$. Consequently, since the inner edge 102 of the annular sheet 96 is attached to the outer rim 98 of the torus' radiator/heating panel 100, its inner radius will be 106 m (347.77 ft) and its outer radius will be 174 m (571.42 ft). The centrifugally produced artificial gravity acting on the outer edge 104 of the sheet due to rotation will be 1.2 g. If this array 96 were oriented broadside to face the Sun with zero angle of incidence, it would be capable of generating 15 MW of continuous electric power assuming an operating efficiency of 18%. Consequently, a system of low mass cryogenic power cables 105 are provided to pick up the power from the spinning array 66 and carry it into the space station. These cables 106 are mounted inside hollow cryogenic tubes 108.

Although the spinning solar array 96 will be capable of generating 15 MW of continuous electric power, it will not usually be operating at this maximum level. This is because the amount of power that is actually required to operate the space station will only be about 2 MW. Furthermore, in order to operate the array 96 at maximum power, it would have to be maintained in an attitude that constantly faces the Sun with zero angle of incidence. Since the area of the array is so large, this situation would result in relatively high atmospheric drag even though the operational altitude of the space station is well above the Earth's atmosphere. Thus, since the generation of electric power will never be of any concern for this space station design, the primary consideration will be directed at minimizing atmospheric drag. This is accomplished primarily by maintaining the spin axis of the torus perpendicular to the orbital plane. By maintaining the space station in this attitude, the velocity vector will always fall in the plane of the solar array 96. Therefore, the array 96 always moves through the tenuous residual atmosphere in an edge-wise attitude. Since the array 96 is actually a thin sheet with very little thickness, the resulting atmospheric drag acting on it will be essentially zero. Since the annular space radiator/heating panel 100 mounted on the rotating torus 12 has little thickness, and is in the same plane as the solar array 96, the drag induced by this panel 100 is also essentially zero.

The total drag acting on the space station can be further reduced by eliminating the drag acting on the rectangular column radiator/heating panels 108. This is accomplished by slowly rotating the column cylinders 16 at a rate equal to 360° per orbit revolution such that the panels 108 will also move through the residual atmosphere in an edge-wise attitude. This rotation rate is sufficiently slow such that, for all practical purposes, all of the laboratories inside the column cylinders 16 will be in a perfect zero-gravity environment. Actually, since many of the laboratory instruments and sensors inside the column cylinders 16 (such as high power telescopes and various radio and radar antennas) require continuous pointing at either the Earth or at the sky above, this slow rotation is a significant benefit. Thus, the two column cylinders 16 will be maintained in an "Earth-fixed" attitude.

The process of maintaining the attitude of the space station such that the spin axis of the torus remains perpendicular to the orbital plane is easily accomplished because of the natural gyroscopic spin stabilization of the torus. However, since the orbital plane of the space station will experience a slight precession due to the regression of its nodes caused by the Earth's slightly ellipsoidal shape, the direction of the spin axis will have to be continuously changed by minute amounts to maintain orthogonality with the orbital plane. This is accomplished by a large attitude control moment gyro 110 mounted at the center of the hub cylinder 18. Since the space station 10 is designed to have its center of mass located in the exact center of the hub cylinder 18, the control moment gryo 110 is capable of continuously rotating the entire space station 10 about any axis to achieve any attitude desired with extremely high accuracy. Consequently, the control moment gyro 110 will be able to keep the spin vector perpendicular to the orbital plane at all times. No attitude control rocket thrusters are required. Small attitude control moment gyros 112 are mounted inside the column cylinders 16.

FIGS. 5 and 6 illustrate how the attitude of the space station 10 is maintained to achieve minimum drag as it moves in its orbit 114 around the Earth 116. The planes of FIGS. 5 and 6 are taken in, and perpendicular to, the space station's orbital plane respectively.

Since the attitude of the space station is determined by a criterion based on minimizing drag and not maximizing the power generated by the solar array 96, the angle $\theta$ at which the Sun's rays fall on the array 96 (i.e., the angle of incidence) will not be zero as in other space station designs. In fact, most of the time it will be far from zero. Hence, the amount of power actually generated by the array 96 will be a relatively small fraction of its full 15 MW capacity. However, the array 96 is so huge that the resulting power is still more than enough to operate the space station. For example, if the angle of incidence is 70°, the projected area of the array along the Earth-Sun line will be 60,000 m$^2$ cos $\theta$=20,521 m$^2$ and the resulting power will be (15 MW) cos $\theta$=5.13 MW which is still more than twice the amount of power required to operate the space station. But there is still another important factor that will effect power generation. If the inclination and altitude of the space station's orbit is relatively low (e.g., 28.5° and 200 km respectively) the station will be in the Earth's shadow about 45% of each orbit revolution. During these periods, the solar array 96 will not be able to generate any electric power. This problem is solved by providing the space station with an efficient superconducting energy storage system. During the time the station is moving in sunlight, about half of the power generated by the solar array 96 is fed into the superconducting energy storage system. The other half is used to operate the space station. The electrical energy accumulated in the superconducting energy storage system during the charging period when the station is moving in sunlight is then used to power the space station when it is moving in the Earth's shadow.

The energy storage system used in the space station is designed as a self-shielding toroidal superconducting coil 118 mounted inside the rotating torus 12. It extends completely around the inside rim of the torus 12 and mounted under the floor 120. A transverse cross-section of the coil 118 is shown in FIG. 7. The major and minor radii of the superconducting coil 118 is 103.8 m (340.55 ft) and 0.7 m (2.3 ft) respectively. Consequently the inside volume V of the toroidal coil 118 will be $2\pi^2 r^2 R = 1,004.98$ m$^3$ (35,455.07 ft$^3$).

The energy density E(J/m$^3$) contained in a magnetic field of strength B (Teslas) is given by the formula $$E = B^2/2\mu_o \qquad (4)$$

where $\mu_o = 4\pi \times 10^{-7}$. Hence, if the average magnetic field strength B inside the coil 118 is 20 T, the amount of inductive energy E stored in the coil 118 will be $E = EV = (400/2 \times 4\pi \times 10^{-7}) \times 1,004.98 = 1.6 \times 10^{11}$ Joules. This represents an enormous amount of stored inductive energy. For example it is enough energy to power the space station continuously for 22.2 hours at 2.0 MW before discharging. Although the magnetic pressure exerted on a superconductor when operating in high strength magnetic fields will be very high, the conductor can be strengthened internally by adding high strength reinforcement fibers as described in my U.S. Pat. No. 4,078,747 filed June 2, 1975, entitled "Orbiting Solar Power Station". In addition, the external walls of the superconducting torus 118 can be further strengthened by wrapping then with thick sheets of Kevlar fabric. A field strength of 20 T is not considered unreasonably high since superconductors operating in fields as high as 52 T have already been developed. (See for example, the paper "52-Teslas, Long-Life Coil For Plasma Research," IEEE Transactions On Magnetics, Vol. MAG-17, No. 5, September 1981, by A. Faryński et al.)

Inductive superconducting energy storage systems are ideal for the proposed space station because their energy density is extremely high. Since the energy is stored inside the volume of the coil in the form of a high strength magnetic field, there are no moving parts and nothing to wear out. Vast amounts of electrical energy can be fed into, stored indefinitely, and extracted from such systems with essentially 100% efficiency. Moreover, the power densities can be extremely high. Extremely high current densities can be extracted over short time intervals with virtually no energy loss. For example, the toroidal superconducting energy storage system 118 designed for the proposed space station will be capable of discharging into some system requiring ultra high power levels at several gigawatts. In particular, it could provide 10 GW of continuous power for 16 seconds before completely discharging. This unique spaceborne capability will be very valuable for testing ultra high power space weapons such as electromagnetic rail guns, beamed laser thermal weapon system, and various particle beam weapon systems that are currently being developed for our country's critically important Strategic Defense Initiative (SDI). Several large laboratories 122 inside the central column cylinders 16 can be set aside for carrying out this research.

The design of the space station's power generating system disclosed herein and represented by combining a large, spin-supported, ultra light-weight sheet of solar cells 96, with a large load-leveling superconducting energy storage system 118, is extremely important because it enables the station to be operated in essentially any orbit desired (with any inclination) with extremely low drag. Thus, the orbital decay of the station even at low altitudes, will be extremely slow—much slower than that of the Power Tower. Notice also, that the drag induced by all of the radiator/heating panels is also zero.

There is another important aspect related to the design and construction of the proposed space station that has not yet been addressed. This concerns the task of spinning up the torus to the required angular velocity $\omega_o = 0.262$ rad/sec after the basic construction is completed. Obviously, the space station can not be considered operational until the torus is rotating with the desired angular velocity. According to the prior art of rotating space station design, this task is accomplished by simultaneously firing a plurality rocket thrusters mounted on the rim structure to produce a tangential rotating thrust as in the design of pinwheel fireworks. But the torus 12 designed for the proposed space station has a very large moment of inertia because of its large dimensions. Moreover, since the spoke cylinders 14 and the solar array 96 are also connected to the torus 12, the total moment of inertia of the torus, with all of the connecting structure, will be very large. Consequently, it would require a large amount of rocket propellant to spin up the torus to the required angular velocity. The job of mounting all of the rocket thrusters on the outside rim of the torus would be very tedious. Moreover, the rockets could not be fired tangentially because of the solar array 96. Hence, they would have to be fired out of the spin plane in order not to damage the solar array 96. This would reduce their efficiency and add to the required propellant mass.

This seemingly difficult spin-up problem can be completely circumvented by designing the main attitude control moment gyro 110 (located at the center of mass of the rotating system) to also function as a large inertial energy storage system (i.e., flywheel system). This dual function design could be easily accomplished by simply replacing the conventional low power electric motor assembly with a high-power, high-torque, electric motor/alternator system and adding a few more parts. With this system, the job of spinning up the torus would be extremely easy. It is accomplished in four basic steps: (1) Just before the system is transported to orbit inside the Shuttle vehicle, the gyro/flywheel 110 is spun up to some fraction of its maximum energy storage capacity. The charging process is such that the resulting spin vector is parallel to the initial spin vector designed for the space station. When this is achieved, the gyro/flywheel 110 is "uncaged" so as to not exert any torque on the Shuttle vehicle while it is being transported up to the space station. (2) After the gyro/flywheel system is mounted inside the central hub cylinder 16 (with the spin axis pointing in the desired direction) and all of the electrical connections are made with the superconducting energy storage system 18 and the central control computer, the spinning gyro/flywheel is "recaged". (3) The gyro/flywheel system 110 is then completely discharged by magnetic forces inside the alternator thereby converting the rotational kinetic energy into electrical energy. This electrical energy is fed into the superconducting energy storage system 118. In view of the principle of conservation of angular momentum, this discharging process (which takes place over several hours) generates a rotating torque that spins up the torus along the desired spin axis. All of the angular momentum initially stored inside the gyro/flywheel system is therefore used to spin up the torus. But this step is not designed to spin up the torus all the way to the desired angular velocity $\omega_o$ because it would leave the gyro/flywheel system without any spin and incapable of performing its primary function—that of serving as an attitude control moment gyro. Consequently, this step is designed to spin up the torus with only half of the required rotational energy. (4) The final step is designed to spin up the torus to the desired angular velocity while simultaneously spinning up the gyro/flywheel system 110 so that it can serve as the main attitude control moment gyro. This is accomplished by first rotating the rotation axis of the non-moving, discharged gyro/flywheel 180° so that the new spin axis will be anti-parallel to that of the torus. After this is accomplished, the gyro-flywheel system is recharged using the same electrical energy put into the superconducting energy storage system 118 in Step 3 when it was discharged. This charging step will therefore generate additional torque on the torus (in the same sense as before) which will, after the gyro system is fully recharged, increase the spin of the torus to the desired angular velocity.

The end result of these four steps is the remarkable fact that the torus can be spun-up to the desired angular velocity without requiring any rocket propulsion (and not rocket propellant and all the associated tedium) by a simple clean process that leaves the gyro/flywheel system operating with its original energy charge, and without requiring any onboard energy generation. Although this process may appear to violate the laws of physics, it is a result of applying the mechanics of gyroscopic motion.

This method can also be used in increase the spin to simulate stronger artificial gravity fields inside the torus (to provide 1.0 g for example) or it can be used to decrease the spin to simulate weaker gravitational fields. By applying the last three steps in reverse order, the torus can be despun to zero at any time. This would allow minor (or major) repair work to be performed on any part of the rotating structure when it is not rotating. This ability to start, stop, or change the rate of spin of the torus at any time without any rocket propulsion is another unique and extremely valuable design feature of the proposed space station.

In order to demonstrate the feasibility of this gyro/flywheel spin control system, it is necessary to perform some detailed quantitative analysis. The total moment of inertia I of the rotating structure can be expressed as $I=3I_c+I_t+I_r+I_s$ where the terms on the right hand side of this equation denote the moment of inertia of the: spoke cylinders, torus, radiator/heating system and solar array respectfully. Omitting the details, it can be shown that $$I_c = \frac{M_c R^2}{3} \ (R = 100 \text{ m})$$

$$I_t = M_t R^2 \ (R = 100 \text{ m})$$

$$I_r = (\tfrac{1}{2})M_r(R_1^2 + R_2^2) \ (R_2 = 106 \text{ m}, R_1 = 102 \text{ m})$$

$$I_s = (\tfrac{1}{2})M_s(R_1^2 + R_2^2) \ (R_2 = 174 \text{ m}, R_1 = 106 \text{ m})$$

where $M_c$, $M_t$, $M_r$, and $M_s$ denote the total mass of the spoke cylinders, torus, annular radiator/heating system and the solar array respectively. These masses are estimated to be: $M_c=50,000$ kg, $M_t=260,000$ kg, $M_r=6,000$ kg, and $M_s=35,000$ kg. Consequently, the total moment of inertia of the loaded rotating structure will be $3.88\times10^9$ kg m$^2$.

The rotational energy E of a body rotating about a point with angular velocity $\omega$ and moment of inertia I is given by the formula $$E=\tfrac{1}{2}I\omega^2 \tag{5}$$

Consequently, since the angular velocity $\omega_o$ required to centrifugally produce the 0.7 g field inside the torus is 0.262 rad/sec, the total rotational energy of the space station will be $1.33\times10^8$ Joules. Advanced state of the art inertial energy storage systems with filament-wound flywheels made of Kevlar can be constructed to give energy densities of $4\times10^5$ Joules/kg. (See the article "Energy Storage: Search for The Perfect Flywheel," *Popular Science,* January 1980, by Susan Renner-Smith.) Hence, the rotational energy of the entire space station can be stored in a Kevlar made gyro/flywheel with a mass of 333 kg (733 lbs). However, as described above, the gyro-flywheel system only has to store one-half of the energy since the spin-up to the required angular velocity $\omega_o$ is accomplished in two stages. Thus, a gyro/flywheel rotor with a mass of only 167 kg (367 lbs) will be sufficient. Since the construction of gyro/flywheel systems having this mass will be easy with Kevlar wound flywheels, the spin-up and spin-down method of controlling the angular velocity of the rotating structure described above is well within engineering feasibility. In the preferred embodiment, the actual mass of the spinning gyro/flywheel rotor will be assumed to be 1,000 kg (2,205 lbs) in order to provide a large margin of safety and for allowing substantial mass growth for the space station. (This system would be capable of storing $4\times10^8$ Joules.)

As described above, the Earth's equatorial bulge causes the orbital plane of the space station to precess a small amount each day. Consequently, the central gyro/flywheel attitude control system 110 must continually change the attitude of the space station by minute amounts to keep the torus' spin vector perpendicular to the moving orbital plane. In order for the gyro/flywheel system 110 to accomplish this task, the center of mass of the entire space station will have to remain fixed at its own center of mass. However, when crew members move around inside the station, the center of mass of the station will shift by small amounts. In order to compensate for this movement, a plurality of computer controlled moving masses 124 are provided to cancel out the effect of moving crew members so that the station's center of mass can remain fixed at the center of the main gyro/flywheel attitude control system 110.

These masses 124 (which are about 500 kg) are mounted inside long channels 126 that slide along longitudinal grooves 128 running along the inside walls of the channels 126. FIGS. 8 and 9 are longitudinal and transverse cross-sections of these channels. The masses 124 are moved by cables 130 attached to servomotors 132. These servomotors 132 receive commands from the central control computer 134. A system of high accuracy inertial accelerometer sensors 136, mounted throughout the space station 10, continuously monitors small movements of the station. The data is encoded into signals and fed to the central control computer 134. The computer processes these signals and generates control commands for moving the balancing masses 124 such that the center of mass of the station remains fixed at the center of the gyro/flywheel system 110. A plurality of these mass distribution control channels 126 are mounted in closed circular hoops below the floor 120 of the living quarters 20 inside the torus 12. Several other mass distribution control channels 126 are mounted along straight lines inside the three spoke cylinders 14 and inside the two column cylinders 16.

FIG. 10 is an enlarged schematic cross-section through the mid-plane of the rotating torus 12 taken perpendicular to the column cylinders. As is illustrated in this figure, the annular radiator/heating array 100, is attached to the outer rim 90 of the torus 12, and the annular solar array 96 is attached to the outer rim 98 of the radiator/heating array 100. The radiator/heating array 100, and the solar array 96 are self-supporting and made rigid by the spinning effect of the torus 12. The superconducting toroidal energy storage system 118 is mounted inside the torus 12, under the floor 120 and adjacent the outer rim 90.

Figure 11:
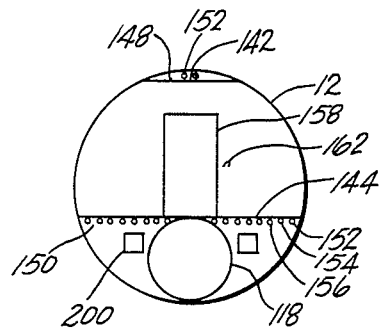
FIG. 11 is a schematic transverse cross-section taken through the mid-plane of a transverse pressure bulkhead mounted inside the torus.
Figure 12:
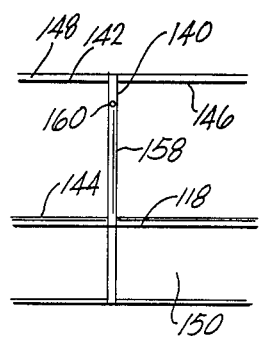
FIG. 12 is a schematic longitudinal cross-section taken through a pressure bulkhead mounted inside the torus.

The living quarters 20 of the torus 12 is divided into 30 separate air-tight compartments 138 by 30 transverse double walled bulkheads 140. FIGS. 11 and 12 are schematic transverse and longitudinal cross-sections through the torus 12 illustrating the design and construction of these bulkheads 140. Beside partitioning the living quarters of the torus into 30 separate compartments, these bulkheads 140 give the hull increased strength and rigidity. The interior of the torus 12 is also partitioned longitudinally by two additional air-tight bulkheads 142,144 that extend in complete circles around the major axis of the torus 12. The upper bulkhead 142 forms the ceiling 146 of the living quarters 20, and the lower bulkhead 144 forms the floor 120 of the living quarters 20. These two additional bulkheads 142,144 add to the strengths and rigidity of the torus 12. All of the 30 separate compartments 148 above the ceiling bulkhead 142, and all of the 30 separate compartments 150 below the floor bulkhead 144 are permanently sealed off from one another and provide air-tight individual storage areas. All wiring 152, plumbing 154, air-conditioning ducts 156, moving mass channels 126, etc., mounted in the torus 12 pass through these upper and lower compartments. If any of these compartments 148,150 develops a leak, or is punctured by a meteorite that results in the loss of its internal pressurization, all of the remaining compartments and all of the living quarters 20 remain unaffected.

All of the transverse bulkheads 140 adjacent the living quarters 20 are equipped with air-tight sliding pressure doors 158. These doors 158 are 1.0 m (3.28 ft) wide and 1.8 m (5.91 ft) high. They are kept closed at all times such that if one compartment of the living quarters loses its internal pressurization, none of the other compartments are affected. The doors 158 are opened and closed by electric motors 160 that are activated by buttons 162 mounted on the bulkheads 140.

The internal arrangement of the living quarters 20 is illustrated schematically in FIG. 10. The overall design strategy of this arrangement is based upon providing exact duplicates of every single item inside the torus 12 (such as computers, electric lighting systems, beds, desks etc.) and mounting them diametrically opposite each other on a line that passes through the center of the torus in order to obtain a well balanced mass distribution that keeps the center of mass at the hub of the torus. This strategy also provides a back-up system for every operating system such that if one system fails, the other duplicate system can take over.

Referring to FIG. 10, the living quarters 20 are equipped with two complete libraries 164, reading and study areas 166, group sleeping quarters (dormitory) 168 and private sleeping quarters 170. The sleeping quarters 168,170 resemble hotel rooms with individual desks, beds, bath rooms (with shower and toilet facilities) clothes closets and even small kitchenettes. Televisions, radios, telephones, etc., are also provided. All of the rooms are sound-proofed with thick sound surpressing insulation necessary for restful sleep and private relaxation. There are also spacious lounges 172, dining rooms 174, galleys 176, gymnasiums 178 and recreation rooms 180. Since the circumference of the living quarters 20 measures 628 m (2,061 ft) which is nearly four-tenths of a mile, there is a vast volume available to make the living quarters resemble those found in the most expensive apartments. Hence, in view of the Earth-like artificial gravity and pressurized atmosphere that is provided, the living quarters will be very comfortable. The only possible disadvantage is that they will be relatively narrow with a width of 4 m (13.12 ft). This is about equal to the width of a 707 jet transport.

The central control rooms 182 for the entire space station 10 are also located in the rotating torus 12 so they can also benefit from the artificial gravity environment. Large computer rooms 184 are also located inside the torus. Since the space station will be accumulating a great deal of analytical data (astronomical, meteriological, biochemical etc.) each computer room will be equipped with a large supercomputer such as the Cray II with 200 megabytes of internal RAM memory. The main communication centers 186 are also located inside the torus 12. Two large machine shops 188 are also provided with complete sets of tools. These rooms 188 are also equipped with work tables and large machine tools for conducting major repair work.

Large rooms 190 are also provided for growing agricultural products including many different vegetables and some live stock (such as chickens). Special plants can be grown to produce oxygen and absorb carbon dioxide for a self-sustaining, regenerative ecological system. Other rooms 192 are provided for filtering and repurifying air and waste water so that they can be reused in a regenerative closed-cycle process. These rooms 192 also include waste treatment systems for processing human waste products. Since each crew member will generate an average of 1.5 kg of waste products each day, a crew of 150 persons will produce an average of 225 kg of human waste each day. These waste products are accumulated in large holding tanks 914 mounted in the hub cylinder 18 and utilized later when they are gasified and used as propellant for onboard electron cyclotron resonance accelerators. As will be shown later, this onboard propulsion system will not only enable the space station to counter orbital decay caused by atmospheric drag, but it willl also enable the station to propel itself onto radically different orbits without requiring the assistance of any outside propulsion system. This is another important and revolutionary design feature of the proposed space station that distinguishes it from all others in the prior art.

Environmental control rooms 196 are provided for housing air-conditioning systems, air-temperature control systems, air ventilation and circulation systems, heating and refrigeration systems, power conditioning systems and pressurization systems. Automated temperature control systems are provided for maintaining a balance between the desired temperature inside the space station and heat generated by the equipment and crew. The air pressure inside the space station is maintained at 0.7 Atm (10.3 psi) with an optimum mix of oxygen and nitrogen.

Dispensary—sick bays 198 are also provided. One of the crew members functions as a medical doctor capable of performing complicated surgical operations.

Essentially all of the supporting equipment needed for operating the superconducting energy storage system 118 (such as cryogenic Dewars, flux pumps, and electronic switches) are stored inside the lower storage compartments 150 under the living quarters. These compartments also contain a vast array of storage batteries 200 for providing emergency back-up electric power. Large quantities of food and fresh drinking water are also stored inside these compartments. Numerous cryogenic vessels containing liquefied air are also stored in these areas for use in the environmental life support systems. Extra equipment used in the various research laboratories and other supplies, materials and replacement parts are stored here.

It is important to point out and emphasize the tremendous advantages that can be derived by providing large space stations. For large space stations, such as the one proposed with a crew of 150, a relatively small percentage of the crew will be needed for operating and maintaining the space station. Consequently, a much higher percentage of the crew will be involved with actual space experiments and other laboratory research. Thus, it will be possible to operate the space station with very high efficiency. As the size of the crew increases, more individuals can become specialized for specific, but very advanced research projects. This would relieve the considerable cross-training problems which are inherent in small crews. For example, it will be possible for a large percentage of the crew to be well known professors from various universities that are highly specialized in relatively narrow, but fundamentally important fields of basic research. Furthermore, by providing a space station with high volume, it will be possible to provide relatively large amounts of volume per individual crew member. This will allow large amounts of volume to be devoted to personal comfort and convenience, and to establish living conditions which are more Earth-like than is possible in small space stations. This will be an important factor in obtaining high operating efficiency with each crew member. The artificial gravity environment and spacious living quarters provided in the proposed space station will provide maximum personal comfort that will be a major factor in realizing very high efficiency. It would be highly unlikely that a world famous scientist from a distinguished university would want to live in a cramped habitat for three months or more in a weightless state (and drugged half the time trying to combat nausea) while, at the same time, trying to conduct original research.

As shown in FIGS. 1 and 2, the torus 12 is connected to the central hub cylinder 18 of the space station 10 by three radial spoke cylinders 14. These spoke cylinders 14 comprise the second major structural components of the space station 10. These spoke cylinders 14 are 96 m (315 ft) long and have transverse diameters of 4 m (13 ft). Unlike the torus, all of these spoke cylinders contain research laboratories. These laboratories are designed to take maximum advantage of the unique opportunity of having available different artificial gravities created by rotation around the hub at different distances.

Each spoke cylinder 14 is divided into 39 separate compartments 202 by 39 transverse pressure bulkheads 204. As in the case of the torus 12, these transverse bulkheads 204 increase the strength and rigidity of these cylinders 14. FIGS. 13 and 14 are schematic transverse and longitudinal cross-sections through an enlarged portion of the spoke cylinders 14 illustrating their internal design and construction. Each bulkhead 204 has a thickness of 1.15 cm (0.45 in). Thus, each of the 39 cylindrical compartments 202 has an internal height of 2.45 m (8.04 ft). All of these cylindrical compartments 202, except the one closest to the hub 18, are utilized as independent research laboratories. The compartment 206 closest to the hub 18 will be utilized as a waiting room or lobby. Hence, there are a total of $3 \times 38 = 114$ different research laboratories 202 located in these spoke cylinders 14 and each has an internal volume of about 28 m$^3$ (974 ft$^3$).

All of the laboratories 202 in each spoke cylinder 14 are connected by a small cylindrical elevator shaft 208. A small circular elevator 210, with an inside diameter of 1.2 m (3.9 ft), moves up and down the shaft 208 via motor driven endless belts 212. The belts 212 are connected to moving counter-weights 214 such that as the empty elevator 210 moves up and down the shaft 208, the center of mass of the spoke cylinder 14 remains unchanged. Two linear mass balancing channels 126 are mounted adjacent the shaft 208 to maintain proper mass distribution when the elevator 210 is being used by crew members. The bottom floor 216 of the elevator is located inside the living quarters of the torus 12 and the top floor 218 is located inside the lobby 206 just below the hub cylinder 18. Consequently, when a person rides up the elevator 210 from the bottom floor 216 to the top floor 218, he gradually loses all of his sensible weight because the centrifugally produced artificial gravity becomes weaker and weaker as the elevator approaches the center of rotation. In order to prevent the passengers from becoming airborne and crashing into the ceiling of the elevator 210 every time it stops at the top floor 218 (inside the lobby 206) foot restraints must be used.

The cylindrical walls of the elevator shaft 220 (FIGS. 13, 14) and the cylindrical walls of the elevator 222 have a double wall construction and both are equipped with two-panel, air-tight, sliding pressure doors that open and close by rotating 60° in opposite directions around the longitudinal axis inside the space between the double walls. There are 40 such doors 224 mounted along the elevator shaft 208. The elevator shaft 208 extends down into the body of the torus 12 such that the first floor 216 is located inside the living quarters 20. The shaft 208 extends upward to the hub cylinder 18 where it ends. It does not extend into the hub cylinder 18. The top floor of the elevator is the 40th floor which is the lobby 206 and which is located one level below the hub cylinder 18. Consequently, in order to reach the hub cylinder 18, one must exit the elevator on the 40th floor and climb up one level. Thus, the hub cylinder 18 will be located on the 41st floor of the space station relative to the living quarters 20 located inside the torus (on the first floor). Since there are three spoke cylinders 14, there are three separate and independent elevator systems that connect the living quarters 20, inside the torus 12, to the hub cylinder 18 and thus, to the two column cylinders 16. The 41st floor is common to all of these elevators and is located in the hub cylinder 18 where the artificial gravity is essentially zero. No stairs need be provided for reaching the hub cylinder 18 from the three lobbies 206. One merely has to jump off the floor of a lobby and float weightlessly into the hub cylinder 18.

When an elevator 210 stops adjacent a particular laboratory 202 inside one of the spoke cylinders 14, the corresponding pressure doors 224 on the elevator shaft 208 inside the laboratory automatically open simultaneously with the elevator pressure doors 226 thereby providing easy entry and exit for each laboratory. The doors 224,226 have a height of 2 m (6.56 ft) and, when opened, provide a passageway 1.04 m (3.41 ft) wide. Consequently, bulky equipment with fairly large dimensions can be easily moved through the spoke cylinders 14 between the hub cylinder 18 and the torus 12 without having to pass through any of the laboratories 202 inside the spoke cylinders 14.

Except for their small size, and the air-tight construction of the pressure doors, these space station elevators are similar in design and operation to ordinary elevators on Earth. The electric motors that drive the elevators are mounted inside the torus under the floor of the living quarters. Since the pressure doors inside each laboratory are air-tight and kept closed at all times when the elevator is not being used, a loss in the internal pressurization of any particular laboratory will not affect any of the other laboratories.

Equation (3) can be used to calculate the strength of the simulated gravitational fields inside each of the 38 laboratories in each spoke cylinder 14. The laboratories on the 39th levels will have the weakest artificial gravity because they have the shortest rotation arm. Since the length of this rotation arm is 6.92 m (measured from the floor of the laboratories) the resulting gravity will be 0.048g. This gravity is approximately equal to that found on the surface of a small satellite with a radius of 400 km. The strongest gravity will be generated inside those laboratories located adjacent the torus 12 because they have the longest rotation arm. Since the length of this arm is 98 m, the resulting gravity will be 0.69 g. The strengths of the simulated gravities inside the laboratories located with various distances from the center of the hub 18 are shown in FIG. 10.

Each spoke cylinder 14 could be devoted to a certain field of research. For example, one spoke cylinder could be devoted to research in the life sciences. Some of the 38 laboratories could be used for investigating the development of plant and animal growth under different gravities. Others could be devoted to the manufacture of different pharmaceutical products under different gravity conditions. Still others could be devoted to studying the biological effects that different gravity environments have on humans for the preparation of manned interplanetary flights to other celestial bodies.

Another spoke cylinder could be devoted to the physical sciences. The 38 laboratories in this cylinder could be used to investigate the effects of variable gravity on materials research, chemical research, structural geology, physics research, etc. One of the most important areas of research would involve the investigation of crystal growth under different gravity environments. This could lead to the development and manufacture of giant single crystals with absolute purity for new computer chips, or for new super-strong materials, or for new superconductors.

The third spoke cylinder could be devoted to mechanical engineering laboratories for studying the operation of machines designed to operate on the surfaces of other celestial bodies with different gravitational fields. This would be important in preparing future manned interplanetary landing missions to other celestial bodies. Structures designed for other celestial bodies could also be tested in these laboratories.

All of the laboratories throughout the entire space station are equipped with remote computer terminals that are connected to the two supercomputers inside the torus. The laboratories are also air-conditioned and maintained at a pressure of 0.7 Atm to provide comfortable shirt sleeve working environments. They are also equipped with hot and cold running water, vacuum conduits, electric power outlets, telephones and other communication systems such as video monitors and closed-circuit television. Since many of the on-going research projects would not require the continued presence of research personnel, many of the research projects could be monitored and controlled by researchers inside the living quarters.

As is shown in FIGS. 13 and 14, two air-tight utility corridors 228 are provided on each side of the elevator shafts 208 and extend along the entire length of each spoke cylinder 14. These corridors 228 contain air ducts 230 for circulating fresh air, water conduits 232, electric power conduits 234, wiring and communication cables 236, sewage conduits 238, and waste water return conduits 240. These corridors also contain ultra high power superconducting electric cables 242 for special high energy laboratories 122 requiring power surges of several gigawatts. These superconducting cables 242 are connected to the superconducting energy storage coil 118 which is capable of being discharged at levels exceeding 10 GW.

FIGS. 15 and 16 are enlarged schematic longitudinal and transverse cross-sections through the prefabricated central hub cylinder 18 of the space station 10. This hub cylinder 18 has an overall length of 12 m (39.37 ft) and an inside diameter of 4 m (13.12 ft). This cylindrical hub 18 is rigidly connected to the three spoke cylinders 14 by three circular connecting flanges 244 mounted around holes 246 cut around the transverse mid-plane of the cylinder 18. Each end 248 of the hub cylinder 18 is connected to a column cylinder 16 along a common longitudinal central axis 250. The hub cylinder 18 is rotating around this longitudinal axis 250 at a rate $\omega_o = 0.262$ rad/sec. However, since both of the column cylinders 16 are maintained in an Earth-fixed attitude, they are rotating about this same axis 250 at a much lower rate equal to $2\pi$ rad/orbital period. (For a 300 km high circular orbit, this rate is 0.00116 rad/sec.) Thus, the coupling between the hub cylinder 18 and the column cylinders 16 must be designed to allow the hub cylinder 18 to freely rotate between the two column cylinders 16. Furthermore, this coupling must be airtight. These coupling conditions can be satisfied by first giving the hub cylinder 18 a reinforced double wall construction at each end in order to obtain relatively deep annular slots, and then locking small extensions of the column cylinders inside these slots in air-tight engagement adapted for rotation about the common longitudinal axis 250.

FIGS. 17 and 18 are enlarged longitudinal and transverse cross-sections taken through one end of the hub cylinder 18 illustrating the general design and construction of the rotating air-tight coupling to the column cylinders. The central section 252 of the hub cylinder 18 is 6 m (19.69 ft) long with a wall thickness of 1.0 cm (0.39 in). Two 4 m (13.12 ft) long coaxial cylinders 254, are rigidly mounted on each end of the hub cylinder 18 in order to give each end a reinforced multi-walled construction. This construction comprises a 2 m (6.56 ft) long double walled section 256 at each end with a hollow 1.0 cm wide annular slot 258, and a 2 m long triple walled section 260 (with wall thickness equal to 3 cm) between the single walled section 252 and the double walled end section 256. A single, 2.5 m (8.20 ft) long cylinder 262 is mounted inside the slot 258 on each end of the central hub cylinder 18 and is designed to freely rotate inside the slot 258 around the longitudinal axis 250. The wall thickness of this cylinder 262 is slightly less than 1.0 cm to give a very snug, air-tight fit. The cylinder 262 is locked into the annular slot 258 by a plurality of internal circular flanges 264 mounted around the inside and outside walls of the cylinder 262 that ride snugly in rotating air-tight sealing engagement inside a like plurality of circular grooves 266 cut into the inner and outer walls of the end cylinders 254.

As is shown in FIG. 17 the outside end 268 of the cylinder 262 is connected to a curving hull section 270 that flairs outward to a greater diameter. This hull section 270 provides the rigid connection between the 4 m diameter cylinders 262 mounted in the slots 258 on each end of the central hub cylinder 18, and the 10 m diameter column cylinders 16. The entire assembly provides an extremely strong and rigid air-tight connection between the more rapidly rotating central hub cylinder 18, and the slowly rotating column cylinders 16 mounted on each side.

A thick-walled transverse bulkhead 272 is mounted on each end of the hub cylinder 18, and a similar thick-walled transverse bulkhead 274 is mounted on each end of the column cylinder extension 262 in a parallel, spaced-apart configuration separated by a narrow gap 276 that is about 1.0 cm (0.39 in) wide. These bulkheads 272,274 are non-contacting but are rotating relative to each other about the common longitudinal axis 250. The outer walls 278 of both of these bulkheads 272,274 have smooth continuous surfaces of aluminum plate 1.0 cm (0.39 in) thick. However, the interiors 280 of both of these adjacent bulkheads have an open truss type contruction that are 1.0 m (3.28 ft) thick. A large network of utility conduits, plumbing, electric cables and wiring is mounted inside these open trusses 280 for providing rotating utility connections between the column cylinders 16 and the hub cylinder 18. Two large waste products storage tanks 194 are mounted inside the hub cylinder 18 on each side of the central attitude control moment gyro/flywheel system 110 and extend up to and flush against the bulkheads 272. Each of these waste products tanks has a volume capacity of 50 m³.

A thick-walled, 1.2 m (3.94 ft) diameter cylinder 282 extends along the central longitudinal axis 250 of each storage tank 194 and through the centers of the adjacent bulkheads 272,274 for providing a wide access tunnel between the column cylinders 16 and the hub cylinder 18. The cylinder 282 begins inside the hub cylinder 18 mounted flush against the beginning 283 of the waste products storage tank 194, extends completely through the waste products storage tank 194, passes through the hub cylinder bulkhead 272 and column cylinder bulkhead 274, and extends for several more meters into the column cylinder 16 along the longitudinal axis 250. The cylinder 282 is divided into two sections 284,286 along a transverse plane passing through the center of the gap 276 between the two adjacent bulkheads 272,274. The adjacent rim faces 288,290 of these cylinder sections 284,286 are held in abutting contact with each other such that as the hub cylinder 18 rotates between the two column cylinders 16 around the longitudinal axis 250, the rim face 288 of inner cylinder section 284 slides around the rim face 290 of the outer cylinder section 286 and remain in air-tight rotating sliding contact with each other. The contacting rim face 288 of the inner cylinder 284 is equipped with a plurality of circular ridges 292 that ride snugly inside a like plurality of circular grooves 294 cut into the contacting rim face 290 of the outer cylinder section 286. These contacting ridges and grooves increase the air-tight integrity of the coupling and also assist in maintaining very precise transverse alignment along the central longitudinal axis 250. The rim faces 288,290 are held together in abutting air-tight rotating sliding contacting engagement by a 1 m long air-tight interlocking sleeve bearing 296 mounted around the two cylinder sections 284,286. One half 298 of this sleeve bearing 296 (50 cm) is mounted around the inner cylinder section 284, and the other half 300 of the sleeve bearing 296 (50 cm) is mounted around the outer cylinder station 286. The sleeve bearing 296 is locked around the two cylinder sections 284,286 by interlocking ridges and grooves 302 that prevent the two cylinder sections 284,286 from pulling apart from each other. The sleeve bearing 296 also maintains the precise alignment between the two cylinder sections 284,286. Each cylinder section 284,286 is also rigidly connected to the adjacent bulkheads 272,274 thereby increasing the structural rigidity of both bulkheads 272,274. The inside seam between the two tunnel sections 284,286 is extremely small thereby preventing small particles of dust and dirt from entering and lodging between them.

As pointed out above, the interior 280 of each bulkhead 272,274 has an open truss type construction that is 1.0 m (3.28 ft) thick separated by a gap 276 of 1.0 cm (0.34 in). Thus, the interior 280 of these bulkheads (mounted adjacent each other) provides a 2.01 m (6.59 ft) wide space for mounting air ducts, utility conduits, plumbing, electric power cables, and thousands of individual wires that connect each column cylinder 16 to the hub cylinder 18. However, since one bulkhead 272 will be constantly rotating relative to the adjacent bulkhead 274, there exists a problem as to how to design connections that will allow this relative motion.

The design of the rotating electrical connections will not be difficult. FIGS. 19 and 20 are enlarged schematic longitudinal and transverse cross-sections illustrating the design and construction of a plurality of rotating electrical connections mounted on the adjacent bulkheads 272,274 that maintain electrical contact. For simplicity, only three different electrical connections are shown in FIGS. 19 and 20 in order to emphasize the basic design and construction. As is shown in these figures, a system of three concentric flat annular rings 304,306,308 made of a suitable electrically conducting material (such as copper) is mounted on one bulkhead 274 that protrude a short distance into the gap 276 between the two bulkheads 272,274. These conducting rings 304,306,308 are mounted on a platform 310 made of insulating material such that the three rings are electrically insulated from each other. Since the rings are all mounted around the central access tunnel 282, they all have diameters greater than 1.2 m (3.94 ft). Three groups of electrically conducting brushes (or springs) 312,314,316 are mounted on the adjacent bulkhead 272 such that the brushes 312,314,316 extend into the gap 276 and make electrical contact with the corresponding conducting rings 304,306 and 308. Thus, each of the brushes in each group are mounted at equal distances from the rotation axis 250. All of the brushes in each group are also in electrical contact with each other but the individual groups are insulated from each other. Consequently, as the inner bulkhead 272 rotates around the outer bulkhead 274, all of the brushes in each group move over the flat annular surfaces of their respective rings. A plurality of lead wires (or conducting cables) 318,320,322, mounted on the bulkhead 272 are connected to each of the three groups 312,314,316 of brushes, and a similar set of lead wires 324,326,328, mounted on the other bulkhead 274, are connected to each conducting ring 304,306,308 respectively.

This is the basic method used for connecting electrical wires and cables in the rotating hub cylinder 18 to electrical wires and cables in the stationary column cylinders 16. The fact that there are more than one brush in each group means that the electrical connection will be very good. If one of the brushes becomes worn out and loses its electrical contact, the other brushes in the group are designed to easily carry the required electrical load. If the power requirements are very low (such as in wiring used for communication or data transmission) the brushes and contact rings could be miniaturized to very small dimensions. For example, each conducting ring could have a width of only 0.01 cm (0.004 in) or less. Thousands of individual electrically insulated wires could be connected in this manner using a network of conducting rings only a few centimeters wide. On the other hand, if an electrical connection is required to operate at very high power levels (such as 50 MW) the conducting ring could have a surface width of 10 cm (3.94 in) or more and the number of conducting brushes in the group could be very large (e.g., 100 or more).

A more challenging engineering problem concerns designing leak-proof rotating connections for moving gases and liquids between the adjacent bulkheads 272,274. The design of rotating connections for transmitting electric power between the hub and column cylinders is relatively easy because electricity is not a material substance. But gases and liquids are material substances and therefore involves fundamentally different design problems—the solutions of which are not immediately self evident. However, in order to construct the proposed space station, large capacity rotating connections for ventilating air-ducts will be required. Connections between circulating water conduits will also be required. Connections for moving cryogenic fluids, such as liquid oxygen and liquid hydrogen, will be required. More exotic connections for cryogenic superconducting electric power cables containing circulating liquid helium and operating at several gigawatts would also be required for the high energy laboratories provided in the column cylinders. The key that provides the solution to this more difficult rotating connection problem is found by applying the unique topological characteristics of toroids.

FIGS. 21 and 22 are enlarged schematic longitudinal and transverse cross-sections illustrating the design and construction of a plurality of rotating toroidal connections for transporting fluid substances (gases or liquids) between the two adjacent bulkheads 272,274 rotating relative to each other about their common rotation axis 250. For simplicity, only three different toroidal connections are shown in order to emphasize the basic design and construction. As is shown in FIGS. 21 and 22, a system of three concentric co-planar toroids 330,332,334 are symmetrically mounted around the access tunnel 282 midway between the two bulkheads 272,274. Each of these toroids is cut into two equal halves 336,338 by a common transverse mid-plane perpendicular to the central rotation axis 250 that passes mid-way between the gap 276 separating the two bulkheads 272,274. Each half 336,338 is mounted on the adjacent bulkheads 272,274 respectively as shown in FIG. 21 and the facing rim surfaces are maintained in sliding contact with each other. The sliding contacting surface area in each toroid is enlarged and made airtight and leak-proof by annular transverse flanges 340,342 mounted around each pair of contacting rim surfaces 344,346. A plurality of circular ridges 348 are mounted on the contacting surfaces of one group of flanges 340 that ride snugly in air-tight, leak-proof engagement with a like plurality of circular grooves 350 mounted in the contacting surfaces of the adjacent group of flanges 342. The ridges riding inside the corresponding grooves also enable each half of the toroids to be maintained in perfect alignment with each other. The adjacent flanges 340,342 are locked together by circular sleeve bearings 352. As the hub cylinder 18 rotates about the rotation axis 250, the toroidal halves 336 rotate around their opposite halves 338 but each torus remains air-tight and leak-proof.

A plurality of conducts 354 are mounted inside the hub cylinder bulkhead 272 and are rigidly connected to the toroidal halves 336 that are also rigidly mounted in this bulkhead 272. Another plurality of conduits 356 are mounted inside the column cylinder bulkhead 274 and are rigidly connected to the opposite toroidal halves 338 that are also rigidly mounted in this bulkhead 274. The rotating toroidal halves of each toroid provides the required rotating air-tight, leak-proof connections between the hub cylinder conduits 354 and the column cylinder conduits 356 for moving gases or liquids between the mutually rotating hub 18 and column cylinders 16.

This is the basic design method used for conveying gases or liquids between the rotating hub cylinder 18 and the column cylinders 16. The fact that there are more than one conduit attached to each toroidal half (in a parallel flow configuration) enables the flow to proceed with very little resistance. These individual conduits are joined later to form larger diameter conduits in each cylinder section. The diameter of the semi-minor axis of each torus can vary over a wide range depending upon the desired flow capacity. For example, those toroidal connections designed for moving ventilating air may have a semi-minor axis diameter of 10 cm (3.94 in) while those toroidal connections designed for moving water may have a semi-minor axis diameter of only 2 cm (0.79 in). By constructing the toroids with electrically conducting material such as copper or aluminum, it is possible to utilize them as additional rotating electrical connections for transmitting electric power.

In the preferred embodiment, three rotating toroidal connections will be used for moving cryogenic liquids between the hub cylinder 18 and column cylinder 16. In particular, one connection will be used for moving liquid oxygen, another for moving liquid hydrogen and another for moving some other unspecified cryogenic liquid. The external surfaces of these toroidal connections will be thermally insulated by thick jackets of cryogenic multilayer insulation. The sliding contacting surfaces of each toroidal half will be designed to be nearly frictionless in order to reduce the generation of frictional heat. The internal diameters of their semi-minor axis will be 20 cm (7.87 in) in order to maximize their volumetric flow capacity while minimizing heat generation.

The design of a rotating superconducting electric power cable connector can be obtained by combining the design disclosed above for rotating electric power connectors with the design of rotating fluid connectors. This design is illustrated schematically in the longitudinal cross-section of FIG. 23. Two annular superconducting surfaces 358,360 are mounted in contacting sliding engagement with each other inside two halves 362,364 of a rotation toroidal connector 366 containing liquid helium 368. One half 362 of the toroidal connector 366 is mounted on the hub cylinder bulkhead 272, and the other half 364 is mounted on the column cylinder bulkhead 274. The external walls 370 of the toroid are covered with a thick jacket of cryogenic multilayer thermal insulation 372. A plurality of superconducting electric power cables 374 are connected to the superconductor 358 of one of the toroidal halves 362 inside the hub cylinder bulkhead 272, and another plurality of superconducting electric power cables 376 are connected to the superconductor 360 of the other toroidal half 364 mounted inside the column cylinder bulkhead 274. These cables 374,376, along with the rotating superconducting toroidal connector 366, provide the superconducting electric power cable connection between the hub cylinder 18 and the two column cylinders 16.

Although all of the contacting surfaces described above in the construction of rotating electrical and fluid connectors between the hub cylinder 18 and column cylinders 16 will generate relatively low friction forces on an individual basis, their accumulative effect may be rather high because of the large number involved. This total frictional force will be increased still higher by the friction generated by the column cylinder extension 262 rotating between the double walls 256 of the hub cylinder 18. Consequently, a plurality of electric drive motors 378 (FIG. 19) are mounted on the hub cylinder bulkheads 272 with toothed driving wheels 380 that engage annular belts 382 mounted in circles around the inner faces of the column cylinder bulkheads 274. The motors 378 are mounted around the bulkheads 272 in diametrically opposite pairs in order to cancel out the effect of their internal torque. Since the rate at which the hub cylinder 18 rotates around the end of the column cylinder 16 will be relatively low (2.5 revolutions per minute) the total amount of electric power required to drive the motors 378 will be low and on the order of about 2 KW. The total rotational torque generated by the force of all of the drive wheels 380 acting on the belts 382, exactly cancels out all of the frictional torque. Consequently, the net resultant torque is always zero. Hence, the motors 378 will have no effect on maintaining the desired angular velocity of the hub 18 (and the connecting torus 12). If the motors 378 are turned off, the frictional forces will gradually spin up the column cylinder 16 to match the spin rate of the hub cylinder 18 (such that there is no relative motion and therefore no frictional forces). Thus, the main purpose of the drive motors 378 is to overcome the frictional forces and to allow the column cylinders 16 to rotate at the precise rate required to achieve a continuous "Earth-fixed" attitude. By changing the rotation rate by a very small amount, it will be possible to give the column cylinders an "inertially-fixed" attitude. This will be an important feature because it will simplify the approach and docking maneuvers of space vehicles visiting the space station.

It is obvious from the above discussion that the hub cylinder 18 with the two column cylinder sections 262 along with the transverse bulkheads 274 and all of the rotating connections, represent the most structurally complicated part of the entire space station. Consequently, this part of the proposed space station will be completely constructed on the ground and transported to the assembly orbit as one complete, prefabricated unit. All of its internal wiring, plumbing, rotating connections, components, and operating systems will be pre-installed and tested before transporting it to orbit. This prefabricated assembly will also include a part 384 of the two flaired hull sections 270—out to a diameter of 4.57 m (15 ft) which is the maximum cargo diameter of the Shuttle's cargo bay. As described above, short cylindrical sections or connecting flanges 244 are also pre-assembled and mounted around each of the three holes 246 for the spoke cylinders 14 and designed to enable the assembly of the three spoke cylinders 14 to be accomplished by simply "plugging" the three spoke cylinders 14 into these connecting sections 244. Three individual pre-assembled attaching rings are also transported up with the pre-assembled hub cylinder 18 for attaching the other end of the spoke cylinders 14 to the holes cut into the torus 12. All of these pre-fabricated assembly features are made possible by designing the cross-sectional diameter of the hub and spoke cylinders to be less than the cross-sectional diameter of the Shuttle's cargo bay. The overall length of the pre-fabricated hub cylinder assembly, including the end sections 262 of the column cylinders up to (and including the flaired sections 384), is 17 m (55.77 ft). Thus, since the Shuttle's cargo bay is 18.29 m (60 ft) long, the pre-fabricated central hub section will easily fit inside the Shuttle with room to spare. (The total mass of the hub section will be about 15,000 kg.)

The most important operational functions of the proposed space station take place inside the two column cylinders 16. As described above, each of these column cylinders is represented by a single cylinder section with a diameter of 10 m (32.81 ft) and a length of 110 m (360.89 ft), a hemispherical section 386, and the 4 m (13.12 ft) diameter cylindrical plug section 262 that is plugged into the annular slots 258 at each end 256 of the central hub section 18.

FIG. 24 is an enlarged longitudinal cross-section of one of the column cylinders 16 illustrating its internal design and construction. As is shown in this figure, the interior of the column cylinder 16 begins with two large cryogenic storage tanks 388,390 used for storing liquid rocket propellant. The first tank 388 contains liquid hydrogen (LH$_2$) 392. This tank 388 begins inside the hemispherical end section 386 and extends for another 10 m (32.81 ft) into the adjoining cylindrical section 394 of the column cylinder 16. It has a total volume and mass storage capacity of 1,000 m$^3$ (35,315 ft$^3$) and 71,000 kg (156,528 lbs) respectively. The second tank 390 contains liquid oxygen (LO$_2$) 396. This tank 390 is 7 m (22.97 ft) long and has a stored volume and mass capacity of 500 m$^3$ (17,657 ft$^3$) and 570,000 kg (1,256,636 lbs) respectively. The ratio between the amount of liquefied hydrogen stored and the amount of liquefied oxygen stored is about 1:8 because this is the combustion ratio of H$_2$/O$_2$ rocket engines.

Since there are two column cylinders in the proposed space station, the total rocket propellant storage capacity of the station is 1,282,000 kg (2,826,329 lbs). This represents an enormous propellant storage capacity and allows the space station to serve as an orbiting refueling station for space based vehicles traveling to many different orbits (such as GEO), or to the Moon, or to other planets on round-trip interplanetary missions. The propellant could be transported in unmanned heavy lift launch vehicles (HLLVs) that are expected to have payload capabilities on the order of 500,000 kg. (See, "Large Payload Launch Vehicles Examined," *Aerospace Engineering*, April 1985, pp. 28–33, by James Brahney.)

In the preferred embodiment, these cryogenic storage tanks are constructed inside the column cylinders by parts transported to orbit inside the Shuttle vehicle. However, in an alternative embodiment, they could also be obtained by simply installing a single Shuttle external propellant tank in each column cylinder. This tank has built-in, thermally insulated cryogenic liquid oxygen and liquid hydrogen storage tanks with a total volume capacity of about 2,000 m$^3$. Since this tank is usually jettisoned when the Shuttle reaches 98% orbital velocity, it will be easy to bring it all the way up to the space station assembly orbit along with the payload. One external tank is simply inserted into each column cylinder and centrally mounted along the longitudinal axis 250 before its interior structure is constructed. Since the outside diameter of the external Shuttle tank is 8 m (26.25 ft) there will be an empty annular region 1 m wide between the inside wall of the column cylinder and the external wall of the Shuttle tank. This vacant annular region could be used for storing additional waste products. Each of these annular waste products storage tanks would have a volume capacity of about 1,000 m$^3$. Since these annular tanks would completely surround the lateral walls of the cryogenic storage tanks, they would also serve as protective meteoroid shields.

The fact that the proposed space station will serve as an orbiting refueling station represents an important design feature that cannot be over-emphasized. Several cryogenic liquid hydrogen, liquid oxygen feed lines 398 extend along the column cylinders into the various hangars for fueling space vehicles with rocket propellant while they are still inside the space station. These cryogenic propellant feed lines 398 also pass through the central hub section of the space station in order to enable propellant to be loaded from either column cylinder. Propellant loading is carried out by drawing equal amounts of propellant from each column cylinder so as to maintain the space station's proper mass distribution. The propellant inside the storage tanks can also be utilized to assist in maintaining proper mass distribution by transferring propellant from one column cylinder to the other column cylinder. This will be very valuable since it will be difficult to maintain proper mass distribution when large orbiting transfer vehicles (OTVs) enter or leave the space station from one column cylinder.

All of the cryogenic storage tanks 388,390 are constructed such that the access tunnel 282 passes through the central longitudinal axis 250. Hence, the tanks 388,390 have a toroidal geometry. FIG. 25 is an enlarged transverse cross-section through the liquid oxygen storage tank 390 illustrating its toroidal construction with the access tunnel 282 passing through the central axis 250. As is shown in this figure, the outer periphery of the access tunnel 282 is surrounded by various air conduits 400, liquid oxygen conduits 402, liquid hydrogen conduits 404, water conduits 406, electric power conduits 408, superconducting electric power conduits 410, communication and data transmission conduits 412, and other utility conduits 414.

The access tunnel 282 extends from the hub, through the waste product storage tank 194, through the transverse bulkheads 272,274 and continues into the column cylinder (along the central axis 250) through the propellant storage tanks 388,390, and emerges inside a cylindrical corridor 416. The total length of the access tunnel 282 is 28.5 m (93.5 ft). The corridor 416 has an inside diameter of 3.2 m (10.50 ft) and is 15 m (49.21 ft) long. This corridor 416 forms the inner boundary of a large, six level complex of zero-gravity laboratories and manufacturing centers 418. FIG. 26 is an enlarged transverse cross-section passing through the center of this complex illustrating the geometrical arrangement of the various laboratories. As is shown in this figure, there are five separate laboratories on each level. The inner walls 420 are cylindrical and have a double wall construction. The side walls 422, separating the adjacent laboratories 424, are flat with a single wall construction. The outer walls 426 are cylindrical and represent the outer hull of the column cylinder. The inside height of each laboratory 424 is 2.49 m (8.17 ft) and the transverse bulkheads 428 between each level is 1.0 cm (0.39 in) thick. Entrance to each laboratory 424 is by means of an electrically operated pressure door 430 that opens and closes by sliding laterally between the inside double walls 420. The construction is such that if one laboratory loses its air pressure due to a meteorite puncture, all of the other laboratories are unaffected. All of the various utility conduits such as air conduits 400, liquid oxygen conduits 402, liquid hydrogen conduits 404, water conduits 406, electric power conduits 408, superconducting electric power conduits 410, communication and data transmission conduits 412, and other utility conduits 414 pass through the corridor 416 adjacent the inner double walls 420.

Since the column cylinders 16 are maintained in an Earth-fixed attitude, those laboratories 432 on one side of the cylinders always face the Earth, while those laboratories 434 on the diametrically opposite side, always face outward toward the sky above the Earth (i.e., toward the local zenith). Thus, some of the laboratories 436 could be involved in Earth sensing observations with small Earth pointing telescopes 438 (and other instruments) while other laboratories 440 could be involved in astronomical observations with sky pointing telescopes 442. The Earth sensing laboratories 436 could be divided into specialized areas such as atmospheric research (i.e., meteorology), optical and radar mapping, military surveillance (involving optical, infrared, radio, radar, etc.), ocean sensing, environmental sensing, Earth resources sensing, etc. Some of these Earth facing laboratories 432 could also be involved in providing various radio/telephone/television communication services for Earth stations.

Besides carrying out astronomical observations, the sky facing laboratories 434 would be ideal platforms for observing man-made satellites moving around the Earth in various orbits. High power telescopes 444 could be moved automatically to track essentially any satellite within its field of view. The main supercomputers inside the torus could contain the detailed orbital elements of every man-made satellite orbiting the Earth. Any suspicious or potentially hostile satellite could be automatically tracked by the telescope's computer controlled pointing system. Since there is no atmospheric distortion, the viewing would be extremely clear. The resolution would be limited only by the quality of the telescope's internal optics—which could be made extremely high. Photographs could be taken with a resolution sufficiently high to enable one to count the individual rivets made in the satellite's construction. This super high-power satellite surveillance capability would be extremely important for enhancing national security.

Most of the laboratories in the complex 418 however, would be involved in basic research with zero-gravity environments. These laboratories 446 could be divided into life and physical sciences. Some of the life science laboratories could be "bioengineering laboratories" where entirely new drugs are developed with specific molecular structures that are tailor-made to either promote or inhibit the effects of certain proteins in the body. This would involve utilizing the zero-gravity environment to grow extremely large, specifically designed, protein crystals. This could only be achieved in a zero-gravity environment since the presence of gravity tends to inhibit the growth and size of complicated protein crystals involving molecules with several thousand atoms. Previous Space Shuttle experiments have already yielded giant crystals 1,000 times larger than the largest Earth-grown ones. These bioengineering laboratories could develop revolutionary new drugs for curing previously uncurable diseases. The drugs could be mass produced in adjacent zero-gravity laboratories inside this complex. This single, relatively minor bioengineering research and development activity, could develop into a multibillion dollar business for the American pharmaceutical industry that could benefit millions of people all over the world and, at the same time, improve the U.S. balance of trade. Unlike previous space station designs such as the proposed Power Tower, the space station disclosed herein will provide the necessary room to take immediate action for mass producing any new drug in quantities large enough to have a major commercial impact.

One of the most important areas of physical science research would be in the field of physical chemistry, and in particular, materials processing. The unique zero-gravity environment will enable perfect inorganic single crystals to be grown to any size desired. This would make possible the development and manufacture of extremely large semiconductors for advanced computer chips. Such chips could have a revolutionary effect on the entire computer industry. Such developments would make the United States the undisputed world leader in this field. The large space station proposed herein could provide the research facilities required for conducting extensive preliminary research and development. It would also provide the numerous zero-gravity laboratories that would be required to mass produce the special materials in large quantities.

Another important area of materials research would be in the field of superconductivity. Since the failure of superconducting cables under high magnetic fields is usually the result of microscopic flaws in the superconductor's crystal structure, the development of superconducting material with perfect crystal structure would have a revolutionary effect. Small superconducting energy storage systems could be developed that could operate in extremely powerful magnetic fields. This could lead to fundamental breakthroughs in energy storage systems and in achieving controlled nuclear fusion.

The list of possible research projects and manufacturing activity that could take place in the zero-gravity laboratories 418 is endless. Although it is impossible to predict what kind of discoveries will be made, and what types of new drugs and materials will be manufactured, this much is clear—they will be truly revolutionary in nature. It will lead to an unprecedented technological revolution in quantum leaps.

One of the main goals in the proposed space station is designed to enable the United States to rapidly exploit the inevitable discoveries and new product developments by privately owned commercial enterprises under the old-fashion laws of supply and demand economics in a world-wide market place. This will not be possible with the proposed Power Tower because of the simple fact that it will be too small. It will be unable to provide the facilities necessary for manufacturing the new products on a scale required for any meaningful commercial exploitation. The method used for expanding the Power Tower by adding more pre-fabricated habitation modules transported up to orbit one-by-one inside a Shuttle vehicle will be too slow and too inefficient relative to the explosive nature that will be generated by the world-wide demand for the new products.

In the space station disclosed herein, each column cylinder 16 will have a complex of 29 zero-gravity laboratories arranged on 6 levels with 5 laboratories on each level (except for the top level which contains 4 laboratories). Consequently, since there are two column cylinders in the proposed space station, there will be a total of 58 such laboratories. Each laboratory will have a volume capacity of 34 $m^3$ (1,201 $ft^3$).

As is shown in FIG. 24, the higher levels immediately above the zero-gravity laboratories 418 contain four different pressurized hangars 448,450,452,454. All of these hangars are separated by transverse bulkheads 456 and have cylindrical walls 458 with inside diameters of 10 m (32.81 ft) that are formed by the hull of the column cylinders. The inside transverse walls of these hangars are dome-shaped and curve outward a distance of 1.0 m (3.28 ft) in order to accomodate increased structural loads brought about by internal pressure differentials between adjacent hangars. The first hangar 448 immediately above the zero-gravity laboratories 418, is used for temporarily storing cargo that is transferred between visiting Shuttle vehicles 460 and the space station 10. This hangar 448 has a height of 20 m (65.62 ft) and is equipped with two pairs of sliding pressure doors 462 that are mounted on each side of the radiator/heater panels 108. Hence, access into the hangar 448 can take place from either side of the column cylinder 16. The doors 462 can also be opened from each side at the same time to allow loading and/or unloading to take place simultaneously from each side of the column cylinder.

FIG. 27 is a transverse cross-section through the center of this hangar 448 further illustrating its internal design and construction. Each door panel 464 is mounted on upper and lower guide tracks 466 that curve around the upper and lower inside circumferential periphery of the hull 468. Each pair of doors 462 open and close by rotating in opposite directions 27.5° around the longitudinal axis 250 and are moved by electric motors 470. Hence, both pairs of doors 462 can be opened simultaneously to provide a 4.62 m (15.15 ft) wide passageway into the hangar 448 on both sides. The height of the doors 462 is 18 m (59.06 ft). The design is such that the height and width of the hangar's passageways are slightly greater than that of the Shuttle's cargo bay in order to easily accomodate the bulkiest payloads that can be carried inside the Shuttle.

Two Shuttle berthing ports 472 are provided outside the hangar 448 adapted for docking two Shuttle vehicles at the same time on each column cylinder. The docking procedure is completely automated and controlled by computers onboard the Shuttle vehicles. The docking is completed by executing a series of several steps: (1) The Shuttle vehicle approaches the space station and executes a terminal maneuver that places it at a precise point adjacent one of the hangar doors 462. It then holds this position (with a certain attitude) by a combination of high pressure attitude control jets and attitude control moment gyros. (2) A plurality of telescoping mechanical arms 474 are extended above and below the hangar doors 462 that latch onto the Shuttle via electromagnets or mechanical grips. (3) The arms 474 are then slowly retracted about 80% which moves the vehicle toward the space station and positions it very close to the hangar 448 such that the Shuttle's cargo bay is directly opposite the hangar doors 462. (4) After a vacuum is established inside the hangar 448, the doors 462 are opened and the cargo is transferred from the Shuttle vehicle into the hangar (or from the hangar into the Shuttle). (5) The doors 462 are then closed and the hangar is repressurized to the normal pressure of about 0.7 Atm (10.29 psi) which is equivalent to the pressure on Earth at an altitude of about 10,000 ft. Since there are two column cylinders 16, the space station is capable of docking four Shuttle vehicles simultaneously.

A circular, 2 m (6.56 ft) diameter pressure door 476, is mounted in the center of each transverse bulkhead 456 in all of the hangars in order to be able to transfer cargo from one hangar deck to any other hangar deck in a pressurized environment without having to go outside the space station. Cargo brought into the space station for delivery into the living quarters 20 is routed down through the lower pressure door 478, into the corridor 416, through the access tunnel 282, around the hub and into the various spoke cylinder elevators 210 leading to the living quarters 20.

Many Shuttle flights to and from the space station will only involve personnel transfer without any bulky cargo. In order to handle these situations more efficiently, a relatively small retractable airlock 480 is mounted above the door panels. Thus, instead of having to evacuate the entire hangar 448, opening the hangar doors 462, and exposing the personnel to a vacuum environment—thereby forcing them to wear protective pressure suits—the transfer is accomplished through the airlock 480 in a continuous shirtsleeve environment. The operation is carried out by extending the retractable airlock 480 toward the Shuttle while it is held in place by the mechanical arms 474. Contact is made such that the walls of the airlock 480 completely enclose a special pressure door mounted on the Shuttle. The connection is sealed and made air-tight by a plurality of interlocking flanges that fit into grooves mounted around the outer periphery of the pressure door. Air is then introduced into the airlock 480 until the pressure is equalized between the interiors of the Shuttle and hangar 448. (The interior pressure of the Shuttle's crew quarters is kept equal to that of the space station.) After the air pressure is equalized, the transfer of personnel takes place in a comfortable shirt-sleeve environment. The airlock 480 can remain connected to the Shuttle vehicle until it is ready to depart from the space station.

In most cases, the Shuttle will be delivering large bulky cargo and the hangar doors 462 will have to be opened to receive it. However, before the doors 462 can be opened, the air inside the hangar 448 has to be removed. Although the simplest procedure would be to vent the air directly into the vacuum of space, this procedure would be very wasteful because the air would be permanently lost. Consequently, a closed-loop, air evacuation/repressurization system, is provided whereby the air inside the hangar 448 is temporarily removed before the cargo transfer, and reintroduced later after the transfer is completed and the doors 462 are closed. This system comprises a battery of large, high capacity vacuum pumps 482 and a high capacity cryogenic air liquefying system 484. The vacuum pump 482 removes the air from the hangar 448 via conduits 486, and feeds it into the air liquefyer 484 where it is reduced to a cryogenic liquid and stored in thermally insulated cryogenic storage vessels 488. Since the volume of the hangar 448 will be about 1,530 m$^3$ (54,031 ft$^3$), the air mass will be 1,254 kg (assuming that the initial air temperature and pressure inside the hangar is 20° C. and 0.70 Atm respectively). The vacuum pumps 482 only have to reduce the pressure to about 0.5 torr (0.001 Atm) because it would take a long time to remove the small amount of remaining air (which would only be about 1.2 kg). The remaining air is simply vented out into space through a plurality of vent holes 490. It will require about 4 hours to reach a pressure of 0.5 torr.

After the cargo transfer is completed and the doors 462 are closed, the air is returned back to the hangar 448 in a much shorter time. But this return process is carried out regeneratively. The liquid air is withdrawn from the storage vessels 488 and compressed by cryogenic hydraulic compressors 492 to about 500 Atm. The compressed liquid air is then fed into the solar heating panels 108 where it absorbs solar thermal energy and vaporizes to become a compressed gas at 100° C. This compressed gas is then fed through a system 494 of serially connected turbogenerator/expanders and reheating solar panels for generating electric power. The electrical energy generated by this system is fed back into the superconducting energy storage system 118 thereby returning almost all of the electrical energy used to operate the vacuum pumps 482 and air liquefying system 484. The exhaust air leaving this electric generating system is discharged back into the hangar 448 to give the same initial temperature and pressure (i.e., 20° C. 0.70 Atm). This closed-loop regenerative system for removing and returning air to the receiving hangar 448 is also used for removing and returning air to the three other hangars 450, 452 and 454. This is accomplished via conduits 496.

As is shown in FIGS. 24 and 27, an elevator shaft 498 is mounted along the inside walls of the hangars. An airlock 500 is provided adjacent the elevator shaft 498 on each hangar deck to allow crew members, dressed in protective pressure suits, to pass in and out of any hangar when it is evacuated. This elevator system is essentially identical to those operating in the spoke cylinders. However, in this elevator, one must pass through the airlock 500 before entering a hangar. Of course, when a hangar is already pressurized, its airlock 500 is pressurized and passage between the elevator and hangar will not require any delay inside the airlock 500. However, if a hangar is evacuated, a crew member (dressed in a pressure suit) wishing to enter the hangar, must spend a few seconds inside the airlock 500 until it is evacuated before he can enter the hangar. The elevator (and elevator shaft 498) is always maintained at the normal space station pressure.

As is shown in FIG. 27, various conduits, such as air conduits 400, liquid oxygen conduits 402, liquid hydrogen conduits 404, water conduits 406, electric power conduits 408, superconducting electric power conduits 410, communication and data processing conduits 412 and other conduits 414 run parallel to the elevator shaft 498 with branches to each hangar deck. The bottom of the elevator shaft 498 is located inside one of the rooms 502 on the sixth level of the laboratory complex 418 under the first hangar 448. The top of the elevator shaft 498 ends in the high energy laboratory 122 located at the top of the column cylinder 16.

The second hangar 450 is smaller than the first hangar 448 and has a vertical height of 5 m (16.40 ft). This hanger 450 is used for housing a fleet of several orbiting maneuvering vehicles (OMVs) 506. These vehicles 506 are unmanned and are remotely controlled from the control rooms 182 located inside the spinning torus 12. They are designed for retrieving malfunctioning satellites and "free-flyers" moving in various orbits several hundred kilometers from the space station. The malfunctioning satellites are brought to the space station and maneuvered to a point opposite the service hangar 454. When a satellite is positioned in front of the hangar 454, the doors 508 are opened and a plurality of telescoping mechanical arms 510 are extended that latch onto the satellite. The arms 510 are then retracted thereby bringing the malfunctioning satellite completely inside the hangar 454 where it can be repaired by a satellite maintenance crew working in a comfortable pressurized shirtsleeve environment. The inside diameter and vertical height of the repair hangar 454 is 10 m (32.81 ft) and 20 m (65.62 ft) respectively. Consequently, the hangar 454 will be able to accommodate relatively large and bulky satellites. In situations where a satellite is too large to be brought into the hangar 454, it can remain outside, but held in place by the mechanical arms 510. After the malfunctioning satellite (or free-flying unmanned platform) is repaired and checked out, it could be returned to its original orbit by another OMV.

This operational capability involving retrieving malfunctioning satellites, bringing them into spacious repair hangars inside the space station, repairing them in pressurized shirtsleeve environments, and then redeploying them back into their original orbits, represents a unique design feature of the proposed space station that is extremely valuable. Since dozens of expensive satellites (such as large communication satellites) could be repaired in this manner, the potential economic benefits, on a strictly commercial basis, would be enormous. Thus, the proposed space station will not only have the capability of serving as a refueling station, but also as a general satellite repair and servicing station as well.

The third hangar 452 is used for housing a large reusable, chemically propelled orbiting transfer vehicle (OTV) 512. This vehicle 512 is designed for transferring high mass payloads between the space station 10 and very distant orbits (such as geosynchronous orbits and lunar orbits) that are way beyond the range of the OMVs. (See, "Preliminary Design for a Space-Based Orbital Transfer Vehicle," *Journal of Spacecraft and Rockets*, Vol. 17, No. 3, 1980, pp. 256-259, by I. O. MacConochie et al.) The OTV 512 would have the performance capability of transferring manned or unmanned payloads with masses on the order of 50,000 kg (110,231 lbs) to lunar orbit. The OTV's performance capability could be significantly increased by "strapping on" additional expendable propellant tanks for high energy missions. After completing each mission, the OTV 512 returns to the space station (which it utilizes as its home base), reenters the hangar 452, via mechanical arms 514, and is refurbished, refueled and checked-out for the next mission. The huge $O_2/H_2$ propellant storage capacity of the space station enables manned landing missions to the Moon to be carried out. Moreover, by utilizing my previous invention of gravity propelled space travel (popularly known as "gravity assisted trajectories") together with two OTVs, it will even be possible to carry out manned landing missions to Mars. (See, *The Determination and Characteristics of Ballistic Interplanetary Trajectories Under the Influence of Multiple Planetary Attractions*, California Institute of Technology, Jet Propulsion Laboratory, TR No. 32-464, October 1963, pp. 45-50 by M. Minovitch.) The possibility of utilizing the proposed space station as the starting point for conducting manned interplanetary landing missions to Mars via chemically propelled OTVs represents another potentially revolutionary design feature of the space station.

It would be relatively easy to carry out manned landing missions to the Moon utilizing the lunar orbit rendezvous technique and a lunar excursion module. The excursion module could be designed to be reusable and highly reliable. After returning to the OTV from the lunar surface, the excursion module could be left in lunar orbit for future landings. The proposed space station would enable manned landing missions to the Moon to be conducted on a routine basis.

As was pointed out above, the last hangar 454 is used primarily for repairing previously deployed malfunctioning satellites (or space vehicles such as OTVs or OMVs). It could also be used for assembling completely new satellites or free-flying platforms. This could be easily carried out in the pressurized shirtsleeve environment of the hangar 454. In view of the large 10 m (32.81 ft) diameter, 20 m (65.61 ft) high dimensions, these new satellites could be relatively large.

The space station could also serve as a base for constructing really large structures such as giant radio antennas with diameters of several hundred meters. In these cases, the construction site could take place a few hundred meters from the space station. The construction could proceed on a continuous non-stop basis using six shifts of construction workers that live in the space station. Each shift could consist of a team of 10 workers dressed in pressure suits and using manned manuevering units (MMUs). They could travel to and from the construction site on their own power. A large work force such as this would enable huge structures to be assembled in relatively short time periods. The overall efficiency of the construction process is greatly enhanced to employing a large work force—which can only be achieved with large space stations such as the one proposed herein. With all of these activities going on simultaneously, the proposed space station can be viewed as a large "space operations center".

In the preferred embodiment, the entire top level 122 of the column cylinder 16 is used as a high energy laboratory for carrying out experiments associated with our country's critically important "Strategic Defense Initiative" (SDI) project. This laboratory 122 has an inside diameter of 10 m (32.81 ft) and a height of 6 m (19.69 ft). The volume is 460 m$^3$ (16,245 ft$^3$). The superconducting electric power cable 410 extends directly into this laboratory 122 and is used for providing power surges exceeding 10 GW. The laboratory is also equipped with an elaborate water cooling system that is connected to the space radiator panels 88 mounted on each side of the column cylinder 16.

The laboratory 122 is equipped for testing all types of laser and particle beam weapon systems. Directed kinetic energy weapon systems, such as ultra high power rapid-fire recoilless electromagnetic rail guns, are also tested. Essentially every type of spaceborne directed energy weapon system can be tested in this laboratory. Particular attention is devoted to developing and testing super accurate pointing and target tracking systems.

Five external "gun mounts" 516 are provided on the end of the column cylinder 16. These gun mounts are circular with an outside diameter of 2 m (6.56 ft). The weapons to be tested are mounted inside standardized "turret cylinders" 518 that pivot between two arms 520 of a connecting "Y"-frame 522. The stem 524 of this Y-frame is connected to the circular mounting platform 516 in a simple detachable "plug-in" design. The entire assembly, representing the Y-frame 522, the cylinder 518 and the weapon system mounted inside the cylinder, is constructed on the ground and transported to the space station via the Shuttle vehicle as a prefabricated self-contained unit that is simply "plugged" into the mounting platform 516. FIGS. 28 and 29 are schematic longitudinal and transverse cross-sections of these prefabricated detachable turret cylinder assemblies. The overall length and diameter are 16 m (52.49 ft) and 4.5 m (14.76 ft) respectively.

The weapons are pointed in various directions by rotating the cylinder 518 between the two mounting arms 520, while the base of the Y-frame is simultaneously rotated around the circular mounting platform 516. The pointing and tracking accuracy is 0.1 seconds of arc ($4.8 \times 10^{-7}$ rad). The movement is accomplished automatically by computer controlled servo motors 526. The supercomputers 134 automatically compute a target's trajectory and generate the required aiming commands almost instantaneously with almost perfect accuracy in order to achieve a hit with the first firing. Since there is no atmosphere, it is possible to achieve unprecedented accuracy.

The fact that the column cylinders 16 will contain over $2 \times 10^{-6}$ kg of propellant will enable them to be extremely stable weapon platforms. that is an important prerequisite for achieving high accuracy aiming. Moreover, this natural inertial stability will be significantly enhanced by the natural gyroscopic spin stabilization that is generated by the spinning torus. Furthermore, each gun cylinder 518 can be equipped with its own internal independent gyro stabilization system. The combined effect of all of these factors operating simultaneously will easily allow pointing and tracking accuracies to be within 0.1 seconds of arc. This translates to a maximum miss distance of only 48 cm (18.90 in) for a target 1,000 km (621 miles) away from the space station. The corresponding cep (circular error probable) would only be about 20 cm (7.87 in) at this range.

Sluing rates are designed to exceed 2° per second in order to acquire track and destroy a multitude of different targets over short time periods. Targets could be acquired, tracked and destroyed at a rate of 10 per minute. Consequently, since there are ten different gun cylinders mounted on the space station, it may be possible to destroy 1,000 ICBM boosters during the first 10 minutes of flight well before they can release their mirved nuclear warheads. If the weapon systems mounted inside the cylinders 518 are recoilless electromagnetic catapults, the overall electric-to-kinetic energy conversion efficiency can be designed to be very high—on the order of 95%. Hence, the thermal loads placed on the cooling system during raped fire gun operation will be relatively low. Cryogenic cooling systems can be provided for rapid fire (or CW) laser or particle beam weapon systems where much greater cooling power is required.

All of the various supporting systems such as superconducting power cables 528, water cooling conduits 530, cryogenic fluid feed lines 532, and various electrical cables 534 are built into or attached to the "Y"-frame 522 and routed into the interior of the cylinder 518 via the two connecting arms 520. The other end of these conduits and cables are connected to the mounting platform 516 by running down the stem structure of the Y-frame.

Some of the cylinders 518 could be used for mounting scientific instruments such as telescopes. For example, the entire "Hubble Space Telescope" could be mounted in the top cylinder 536 for optimum omnidirectional viewing.

Although the proposed space station is designed to generate very low drag forces, there will nevertheless be some drag and this drag will cause a slow, but steady orbital decay. Thus, it will be necessary to counter this decay by periodically propelling the space station back to the initial orbital altitude. This is accomplished by two high power superconducting electron cyclotron resonance accelerators 583 (FIG. 24) mounted near the end of each column cylinder 16. Superconducting electron cyclotron resonance accelerators are used for the propulsion system because they are very efficient and can be operated at exceeding high power densities. They have no moving parts or electrodes, and can accelerate any gas to very high exhaust velocities. The basic operating principles of these accelerators involve ionizing a low density gas to obtain a "low temperature" plasma, and then accelerating the plasma by magnetic and electrostatic forces. The primary energy input is represented by a high power GW microwave beam that is propagated through the longitudinal axis of a superconducting magnetic solenoid. (For a detailed technical description of superconducting electron cyclotron resonance accelerators see "Self-Refueling Rocket Propulsion for Future Space Travel," AIAA/-

SAE/ASME 21st Joint Propulsion Conference, Monterey, Calif., July 8-10, 1985, AIAA Paper No. 85-1370 by M. A. Minovitch.) Since these accelerators can accelerate any gas, they will provide an excellent means for propulsively ejecting all of the non-recyclable human and animal waste products (i.e., feces) that are produced onboard the space station. These waste products are accumulated and stored in large holding tanks 194 mounted inside the hub cylinder 18 and utilized as propulsive propellant for these engines. When it is time to propel the space station back up to the initial orbital altitude, the waste products are gasified (by biological or heating processes) and slowly fed into the ECR accelerators 538 where they are accelerated to very high exhaust velocities. This technique will provide more than enough propulsion to periodically propel the space station back up to its initial orbit after decaying to a lower orbit by the effects of atmospheric drag. In fact, it will provide enough propulsion for propelling the space station onto essentially any orbit desired—even geosynchronous or lunar orbits!

In order to quantitatively demonstrate the performance capability of the onboard propulsion system, suppose that the initial altitude of the space station is 300 km (162 nm). Suppose also that after 12 months, the orbit decays to an altitude of 280 km (151 nm) and that propulsion is applied at this point to propel the space station back up to the initial 300 km circular orbit. The total propulsive $\Delta V$ required to execute this (spiralling) maneuver is about 13 m/sec. Suppose that the total gross mass of the space station before the propulsive maneuvers is $2 \times 10^{-6}$ kg. If the ECR accelerators are operated with a specific impulse of 1,000 seconds, then the amount of feces required to execute the manuever will be 2,651 kg. If the effective propulsive power is 500 KW for each accelerator, the mass flow rate m through each accelerator will be 10.143 gm/sec. Hence, the total thrusting time will be 35.36 hours (1.47 days). However, the average production rate of human feces and other non-recyclable waste products will be about 1.5 kg/day-person. Consequently, a crew of 150 will produce about 225 kg/day. If this propellant is manufactured at this rate continuously for 12 months (when the orbit is gradually decaying from an altitude of 300 km, down to an altitude of 280 km) the amount of feces accumulated during this time will be 82,183 kg—which is 79,532 kg more than is required to execute the manuever! With this additional propellant available, it will be possible to propel the space station onto radically different orbits such as polar orbits. This possibility of being able to radically change the space station's orbit (e.g., from 28.5° inclination orbits to 90° inclination polar orbits) without requiring any external propellant brought up from the Earth's surface by the Shuttle vehicle, represents another revolutionary design feature of the proposed space station. Prior art space station designs, such as the Power Tower, find it difficult to supply the required propulsion necessary to periodically propel the station just a few kilometers back up to the initial orbital altitude after decaying by atmospheric drag. A large amount of propellant has to be transported up to the station in special Shuttle flights. This is a very tedious, time-consuming and expensive task. It would be essentially impossible to propel a prior art space station onto a radically different orbit after it is assembled in its initial orbit. In the prior art space station designs, all human waste products are placed in containers and periodically transported back to Earth in Shuttle vehicles.

With an average feces propellant production rate of 225 kg/day, it would be possible to operate the ECR engines continuously without ever running out of propellant. The minimum specific impulse required to achieve this continuous operation (assuming an effective propulsive power of 500 KW per accelerator) is 2,828 seconds. The total thrust generated by both accelerators would be 72.169N (16.224 lbs). Thus, the space station could be maneuvered, on its own power, to essentially any orbit desired without ever having to be supplied with propellant from the ground. This includes GEO, lunar, or polar orbits.

It should also be pointed out and emphasized that if the space station is manuevered to polar orbits, the solar array would generate close to its maximum effective power of 15 MW because it could be oriented nearly broadside to the solar radiation (the angle of incidence $\theta$ would be almost 0°). The total power generation would be (15 MW) cos $\theta \approx 15$ MW. This would allow the ECR accelerators to be operated at much higher power levels. A five-fold increase in operating power would be possible. This would significantly reduce the time required for carrying out the propulsive maneuver. For example, it would only require about 12 months of continuous thrusting by the ECR engines to change the orbital inclination of the space station from 28.5° to 90° (starting with an initial feces propellant supply of 100,000 kg).

During the time when the space station's interior is being constructed and equipped with all of the various operating systems (which could require a year or more to complete) a low 28.5° inclination orbit would be the most economical because this orbit would allow the Shuttle vehicle to be operated with maximum payload mass. However, this orbit would not be suitable for military surveillance purposes because only a relatively small strip of the Earth's surface could be observed at this inclination—a strip bounded by about 30° N latitude and 30° S latitude. If the orbit had an inclination of 80° or more, the entire land mass of every country on Earth, and all of the navigable oceans could be observed every day.

There is one particular orbit that may be ideal for both military surveillance and SDI purposes. This orbit has an altitude of 566.87 km (306.09 nm) and an inclination of 97.618°. This orbital altitude is ideal because the period is 96.00 minutes. Hence, the space station would make exactly 15 complete orbit revolutions every 24 hours. The ground track directly under the space station would be shifted 24° in longitude on each successive pass due to the Earth's rotation. Consequently, every point on the Earth's surface would be directly observable (either optically with telescopes or electronically with radar) every 24 hours. The 97.618° inclination would enable the space station's orbital plane to be automatically shifted via nodal regression to follow the Sun such that the solar array will generate close to maximum power continuously 24 hours a day, 365 days a year. Thus, the superconducting energy storage system 118 could be used exclusively for powering the various space weapons onboard the space station—which would be continuously augmented with 13 MW of additional electric power since only about 2 MW of electric power is needed to operate the space station. Consequently, this orbit would make possible continuous surveillance of the entire Earth while, at the same time, enabling the space station to generate vast amounts of electric power that could be used to operate the various space weapons.

An ultra high-power "look-down" radar system could be operated continuously to detect and monitor the trajectories of essentially all aircraft, ballistic missiles, cruise missiles, and even ocean going vessels all over the world. Hostile targets, such as low flying aircraft or large naval vessels could also be destroyed by the high-power directed energy weapon systems on-board the space station. Thus, the space station could be used as a truly global weapon system for destroying essentially any hostile target moving on or above the Earth's surface. It could even be used for carrying out selected pin-point attacks on enemy troop concentrations. (The psychological effects on enemy troops would be extremely demoralizing.)

As an alternative orbit, the space station could utilize its ECR propulsion system to boost itself into a zero degree inclination, geosynchronous orbit at 120° E longitude. This would enable the space station to continuously monitor the entire land mass of the Soviet Union (along with its captured Eastern European countries) in order to attack and destroy any hostile missiles that may be launched against the United States or against any of its allies. This orbit would also enable the solar array to generate a maximum amount of electric power on a continuous basis, 24 hours a day, 365 days a year. The amount of ΔV required to reach this orbit is about 5.8 km/sec which is about half that required to reach the 97.618° inclination orbit. This GEO orbit could be reached in about 9 months of continuous propulsion. However, in this case, the crew size would be reduced down to only about 20 in order to alleviate the problems of providing ground-to-orbit transportation for crew rotation at that altitude.

The above discussion was intended to show that the proposed space station will not only be useful in purely scientific research, technological advancement, commercial enterprises, and space exploration, but it will also have a tremendous potential fo providing revolutionary military surveillance and for providing an ideal space platform for developing, testing and even deploying space weapons for our country's SDI program. All of these activities could be conducted with the proposed space station on a scale hundreds of times greater than what could be achieved with prior art space station designs, such as the Power Tower, but at a cost only slightly more than that project. Moreover, the prior art designs are intended to be expandable into large structures comprising many small zero-gravity habitation modules, thus locking in a long-term, space station design that has no possibility of providing any artificial gravity environment for the living quarters. Consequently, if the Power Tower type designs are actually implemented it may take the United States down a long and costly road that may result in manned space stations that are completely useless because one-half of the crew becomes incapacitated with nausea and space sickness and the other half of the crew is tied down helping the incapacitated crew members, or performing wasteful activities designed to prevent space sickness.

In view of the fact that the proposed space station provides an Earth-like artificial gravity environment and an Earth-like atmospheric environment for the living quarters, there is nothing more that can be added to better simulate the living conditions on Earth. Thus, in this respect, the proposed space station can never become obsolete. It will always provide a comfortable environment to live in and it will always provide spacious zero-gravity, and variable gravity environments for conducting research. Since the proposed space station will provide all of these advantages with very reasonable cost and with today's technology, it would be much more economical in the long run to abandon plans for constructing the proposed Power Tower and to construct the proposed space station instead. Moreover, it would save several decades of time since the proposed space station, with its comfortable Earth-like artificial gravity environment, will have to be constructed sooner or later anyway in order to accommodate the high percentage of skilled researchers and technicians who could never live in a weightless environment over extended time periods. Thus, the proposed space station makes it possible to leap-frog several decades into the future and construct a really functional space station now, with relatively little cost, instead of wasting an enormous amount of time, money and effort constructing a space station that will be completely obsolete way before it is ever put into operation.

The proposed space station is also expandable. But it is expandable in truly giant steps—yet at a cost only slightly more than the cost of expanding the prior art designs. For example, FIG. 30 shows a space station that has been expanded by adding another rotating torus 540. The expansion proceeds by bringing up another toroidal inflatable core, inflating it, and wrapping it with sheets of Kevlar and aluminum just as in the construction of the original torus 12. The new spoke cylinders are also constructed as described in the original structure. The assembly proceeds by disconnecting one of the old column cylinders 542 from one end of the original hub cylinders 18, and coupling it to one end of the new hub cylinder 544. The other end of the new hub cylinder 544 is coupled to the uncoupled end of the old hub cylinder 18. The entire construction and assembly would only require about 5 Shuttle flights. Of course, it would require more Shuttle flights to bring up all of the internal systems and new equipment but the crew accommodations would be doubled in size—from 150 to 300. This expansion could be continued indefinitely in an open-ended process. New column cylinders could also be constructed and inserted between adjacent toroids. The solar array could also be expanded.

It should be pointed out that in computing the number of Shuttle flights required to construct the proposed space station (or to expand it) the Shuttle's maximum deliverable payload mass was assumed to be 30,000 kg. However, if and when the proposed space station is actually constructed, the Shuttle's maximum payload mass would probably be much higher because of various technical improvements. Thus, the total number of flights actually required to construct the station will probably be much lower.

The proposed space station could have many different types of systems for generating electric power instead of using a solar array. For example, electric power could be generated by a solar thermal system. It could also be generated by means of a nuclear-electric system.

It should also be pointed out that the proposed space station could have many different geometrical shapes and sizes. For example, instead of mounting a column cylinder on each end of the hub cylinder, large spheres could be mounted instead. Or, in another embodiment, a large sphere could be added on the end of each column cylinder. Or, in still another embodiment, the entire space station could be one giant sphere that is rotating about some axis. The basic method of construction, however, remains the same. An inflatable surface with thin flexible walls is transported to orbit and inflated to form a semi-rigid, thin-walled structure. This structure is then wrapped with material to increase the wall thickness and to increase its rigidity. The resulting structure can be connected to other similarly constructed structures to form a larger structure or "space station". This is the basic invention disclosed herein.

There are many variations of this basic orbital construction method that can be employed during the practice of this invention. For example, the inflatable surface can be transported to orbit in several separate sections and joined together via gas-tight zipper-like seams to form one giant inflatable surface with unlimited dimensions. After the surface is inflated, it could be wrapped to form one single structure with very large dimensions.

This basis revolutionary low cost orbital construction method will make possible the construction of enormous toroidal-shaped orbiting hotels with dimensions large enough to accommodate hundreds of guests in multi-decked spacious living quarters with pressurized atmospheric and gravity environments indistinguishable from those existing on the Earth's surface. Except for the more modern appearance of the rooms inside an orbiting hotel, it would be impossible for a guest to distinguish living in it, from living in the most luxurious hotel on the Earth's surface. However, the view through large windows in an orbiting hotel would be spectacular. Every room would be a penthouse on top of the world. Thus, the proposed orbital construction method will open the door to a highly profitable commercialization of space on a scale previously believed to be possible only in the distant future.

From the foregoing descriptions, it will thus be evident that the present invention has provided a vastly improved method for constructing large continuous-walled structures *on the Earth's surface or* in orbit such as permanently manned space stations at very low cost. As various changes and modifications can be made in the above construction method and space station design without departing from the spirit or scope of the invention, it is intended that all matter contained in the above description or as shown in the accompanying drawings should be interpreted as illustrative and not in a limiting sense.

What is claimed is:

1. A method for constructing a structure in orbit comprising the steps of:
   inflating a light-weight inflatable surface in space to form a semi-rigid, thin-walled guide structure;
   mounting an automated wrapping wheel around a portion of said inflated guide structure, said wheel containing flexible wrapping material; and
   moving said wrapping wheel around said inflated guide structure thereby wrapping said inflated guide structure with said wrapping material to increase the wall thickness, strength, and rigidity of said structure.

2. A method as set forth in claim 1 wherein said inflatable surface comprises a flexible, non-elastic fabric woven with Kevlar fibers that is made gas-tight by an inner sealing membrane.

3. A method as set forth in claim 1 wherein said wrapping material comprises at least one long flexible sheet rolled up on a removable spool mounted on said wrapping wheel and further comprising the step of removing said spool after said sheet has been wrapped around said inflated surface and replacing said spool with a new spool of wrapping material so that many layers of wrapping material can be wrapped around said surface to produce any desired wall thickness for said structure.

4. A method as set forth in claim 1 wherein said step of wrapping said material is accomplished automatically by said automatic wrapping wheel.

5. A method as set forth in claim 1 further comprising the step of bonding said wrapping material to said guide structure by dispensing bonding material.

6. A method as set forth in claim 5 further comprising the steps of:
   wrapping more than one layer of said flexible wrapping material around said guide structure; and
   bonding adjacent layers to each other so as to form a multi-layered laminated wall around said guide structure.

7. A method as set forth in claim 6 wherein said flexible wrapping material is fabric woven with Kevlar fibers.

8. A method as set forth in claim 1 further comprising the step of wrapping additional layers of new material over said first material in order to increase the structural rigidity and strength of said structure.

9. A method as set forth in claim 8 wherein said second material is a long sheet of aluminum alloy.

10. A method as set forth in claim 9 further comprising the steps of:
    wrapping more than one layer of said sheet of aluminum alloy around said structure; and
    bonding adjacent layers of said aluminum alloy sheet to each other so as to form a multi-layered laminated second wall around said structure to increase the strength and rigidity of said structure.

11. A method as set forth in claim 1 further comprising the steps of constructing at least one another structure in orbit comprising the steps of:
    inflating a second inflatable surface to form a second guide structure;
    wrapping said second guide structure with material to increase the wall thickness and rigidity of said second structure;
    connecting said first structure to said second structure so as to form one gas-tight large structure; and
    pressurizing said gas-tight structure with a mixture of oxygen and at least one other gas to provide a breathable life-sustaining environment inside said structure.

12. A method as set forth in claim 11 further comprising the step of rotating a portion of said pressurized structure to provide a centrifugally produced artificial gravity environment.

13. A method for constructing a manned space station in orbit comprising the steps of:
    inflating a lightweight flexible toroidal surface in space;
    wrapping said inflated toroidal surface around its minor axis with sheets of flexible material thereby creating a rigid toridal structure;
    pressurizing said toroidal structure with a mixture of oxygen and at least one other gas to provide a breathable life-sustaining environment inside said structure; and
    rotating said toroidal structure about its major axis to provide an artificial gravity environment inside said structure.

14. A method as set forth in claim 13 wherein said step of wrapping said material around said inflated toroidal surface is accomplished automatically by an automatic wrapping machine.

15. A method for constructing a manned space station in orbit comprising the steps of:
 inflating a lightweight flexible toroidal surface in space;
 wrapping said inflated toroidal surface around its minor axis with sheets of flexible material thereby creating a rigid toroidal structure;
 inflating a lightweight flexible cylindrical surface;
 wrapping said inflated cylindrical surface around its longitudinal axis with sheets of flexible material thereby creating a rigid cylindrical structure;
 cutting a plurality of holes around the inside periphery of said rigid toroidal structure;
 mounting sections of said cylindrical structure around said holes so as to form spoke cylinder passageways into the interior of said toroidal structure;
 mounting a central hub structure at the center of said toroidal structure by connecting said hub structure to said spoke cylinders so as to form air-tight passageways into said hub structure;
 pressurizing the interior of said connected toroidal, cylindrical and hub structures with a mixture of oxygen and at least one other gas to provide a breathable, life-sustaining environment inside said connected structures; and
 rotating said toroidal structure about its major axis to provide an artificial gravity environment inside said structure.

16. A method as set forth in claim 15 further comprising the steps of:
 attaching at least one other cylinder to said hub structure centered along the rotation axis of said torus; and
 maintaining said cylinder in an Earth-fixed attitude by rotating said cylinder.

17. A method as set forth in claim 15 further comprising the step of mounting an annular light-weight photovotaic sheet of solar cells on the outer rim of said toroidal structure such that the rotation of said toroidal structure gives the array a rigid support generated by centrifugal force.

18. A method as set forth in claim 15 further comprising the steps of:
 accumulating human and animal waste products inside a containment vessel; and
 propulsively ejecting said waste products to propel said structure onto various orbits.

19. A method as set forth in claim 15 wherein the step of rotating said space station comprises the steps of:
 mounting a spinning fly-wheel means inside the central hub structure; and
 slowing down said spinning fly-wheel means thereby transferring angular momentum from said fly-wheel to said space station.

20. A method as set forth in claim 19 further comprising the step of slowing down the rate of rotation of said space station by increasing the angular velocity of said spinning fly-wheel thereby transferring angular momentum from said space station to said fly-wheel.

21. A method as set forth in claim 15 further comprising the step of mounting elevators inside said spoke cylinders for transferring crew members between the central hub structure and the toroidal structure.

22. A method for constructing a structure in orbit comprising the steps of:
 inflating a thin-walled, closed surface in space;
 mounting an automated wrapping machine containing flexible wrapping material around a portion of said inflated surface; and
 wrapping said wrapping material around said inflated surface by means of said wrapping machine to obtain a stress bearing rigid structure.

23. A method as set forth in claim 22 wherein said wrapping material comprises at least one long flexible sheet rolled up on a removable spool mounted on said wrapping machine and further comprising the step of removing said spool after said sheet has been wrapped around said inflated surface and replacing said spool with a new spool of wrapping material so that many layers of wrapping material can be wrapped around said surface to produce any desired wall thickness for said structure.

24. A method for constructing a structure comprising the steps of: inflating a flexible, thin-walled closed surface;
 mounting a wrapping machine containing flexible wrapping material around a portion of said inflated surface; and
 wrapping said wrapping material around said inflated surface by means of said wrapping machine to obtain a stress bearing rigid structure.

25. A method as set forth in claim 24 further comprising the step of transporting said flexible surface into space prior to said inflation step for constructing said structure in space.

26. A system for constructing a structure in orbit comprising:
 a lightweight inflatable surface;
 means for inflating said surface with gas so as to form a semi-rigid, thin-walled, guide structure;
 an automated wrapping wheel;
 at least one long sheet of flexible wrapping material mounted on said wrapping wheel; and
 means for moving said wrapping wheel around said inflated guide structure such that as said wheel moves around said inflated structure, said wrapping material is automatically wrapped around said inflated guide structure.

27. A system as set forth in claim 26 wherein said inflatable surface is a high-strength fabric woven with Kevlar fibers that is made gas-tight by an inner sealing membrane.

28. A system as set forth in claim 26 wherein said inflated guide strucstructure has a toroidal shape.

29. A system as set forth in claim 26 wherein said sheet of wrapping material is wrapped around said inflated guide structure in several layers and further comprising means for bonding said layers to each other so as to form a rigid, multi-layered, high-strength laminated wall.

30. A system as set forth in claim 26 wherein said wrapping material is composed of at least one long sheet of fabric woven with high-strength Kevlar fibers and at least one long sheet of an aluminum alloy.

31. A system as set forth in claim 26 further comprising:
 a spool containing said sheet of flexible wrapping material detachably mounted on said wrapping wheel; and
 means for removing said spool after said sheet has been wrapped around said inflated surface and replacing said spool with a new spool of wrapping material so that many layers of wrapping material can be wrapped around said inflated surface to produce any desired wall thickness for a said structure.

32. A system for constructing a structure in orbit comprising:
a plurality of light-weight inflatable surfaces;
means for inflating said inflatable surfaces with gas so as to form a plurality of semi-rigid, thin-walled, guide structures;
means for wrapping portions of said plurality of inflated guide structures with a flexible material thereby obtaining a plurality of rigid structures, said wrapping means comprising at least one automated wrapping wheel containing said flexible material and means for moving said wrapping wheel around said inflated guide structures such that as said wheel moves around said inflated structures, said wrapping material is automatically wrapped around said inflated guide structures; and
means for connecting said plurality of rigid structures together so as to form one large structure.

33. A system as set forth in claim 32 wherein said connected structure is a torus with a plurality of spoke cylinders that converge to a central hub structure, and two column cylinders connected to opposite ends of said hub structure along a line perpendicular to said spoke cylinders.

34. A system as set forth in claim 33 further comprising means for rotating said torus about its major axis for creating a centrifugally produced artificial gravity environment inside said torus.

35. A system as set forth in claim 34 further comprising means for pressurizing said connected structure with a mixture of oxygen and at least one other gas to provide a breathable, life-sustaining environment inside said structure.

36. A system as set forth in claim 35 wherein said column cylinders are connected to said hub structure by an air-tight, rotating, swivel joint means such that said column cylinders can be rotated about their longitudinal axes with an angular velocity different from the angular velocity of said torus and further comprising means for maintaining said column cylinders in an Earth-fixed attitude.

37. A system as set forth in claim 32 further comprising:
container means for accumulating human and animal waste products;
means for gasifying said waste products; and
means for accelerating and ejecting said gasified waste products for generating propulsive thrust for maneuvering said structure.

38. A system as set forth in claim 34 further comprising an annular sheet of solar cells having an inside rim and an outside rim and further comprising means for connecting said inside rim to said rotating torus such that said sheet of solar cells is kept rigid by centrifugal force.

39. A system as set forth in claim 38 further comprising an attitude control system onboard said structure whereby the rotation axis of said torus is maintained perpendicular to the structure's orbital plane.

40. A system as set forth in claim 32 further comprising:
a spool containing said flexible wrapping material detachably mounted on said wrapping wheel; and
means for removing said spool after said material has been wrapped around said inflated surface and replacing said spool with a new spool of wrapping material so that many layers of wrapping material can be wrapped around said inflated surface to produce any desired wall thickness for said structure.

41. A system as set forth in claim 34 wherein said means for rotating said torus comprises:
a spinning fly-wheel mounted inside the central hub structure; and
means for decreasing the angular velocity of said spinning fly-wheel thereby transferring angular momentum from said fly-wheel to said toroidal structure.

42. A system as set forth in claim 41 further comprising means for slowing down the rate of rotation of said toroidal structure by transferring angular momentum to said fly-wheel.

43. A system as set forth in claim 33 further comprising at least one elevator mounted in one of the spoke cylinders for transferring crew members between the central hub structure and the toroidal structure.

44. A system as set forth in claim 36 further comprising means for transferring gas, fluid, electrical power, electrical signals, and crew members between said column cylinders and said hub structure while rotating relative to each other.

45. A system as set forth in claim 36 further comprising at least one airlock mounted on one of the column cylinders for allowing crew members dressed in protective space suits to pass between the pressurized interior of said space station and the exterior vacuum environment.

46. A system as set forth in claim 38 further comprising a toroidal superconducting inductive energy storage system mounted inside said rotating torus for electrical load leveling and for generating ultra high power surges several times greater than that generated by said sheet of solar cells.

47. A system for constructing a structure comprising:
a closed flexible inflatable surface;
means for inflating said surface with a gas thereby rendering said surface semi-rigid;
a sheet of wrapping material;
a wrapping machine containing said sheet of wrapping material;
means for mounting said wrapping machine around a portion of said inflated surface; and
means for wrapping said material around a portion of said inflated surface by said wrapping machine to obtain a rigid, stress bearing structure.

48. A system as set forth in claim 47 further comprising:
a spool containing said sheet of wrapping material detachably mounted on said wrapping machine; and
means for removing said spool after said sheet has been wrapped around said inflated surface and replacing said spool with a new spool of wrapping material so that many layers of wrapping material can be wrapped around said inflated surface to produce any desired wall thickness for said structure.

* * * * *